(12) United States Patent
Miyazaki et al.

(10) Patent No.: US 7,525,720 B2
(45) Date of Patent: Apr. 28, 2009

(54) PROCESS FOR PRODUCING SHEET FOR ELECTROPHORETIC DISPLAY, SHEET FOR ELECTROPHORETIC DISPLAY, AND ITS USE

(75) Inventors: Atsushi Miyazaki, Fujimi-machi (JP); Akio Ito, Suita (JP); Mitsuo Kushino, Inagawa-cho (JP)

(73) Assignees: Nippon Shokubai Co., Ltd., Osaka (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/142,295

(22) Filed: Jun. 2, 2005

(65) Prior Publication Data

US 2006/0132895 A1  Jun. 22, 2006

(30) Foreign Application Priority Data

Jun. 2, 2004  (JP) .............................. 2004-164961
May 26, 2005 (JP) .............................. 2005-153509

(51) Int. Cl.
  *G02B 26/00* (2006.01)
  *G09G 3/34* (2006.01)
  *G03G 17/04* (2006.01)

(52) U.S. Cl. ................... 359/296; 345/107; 430/32
(58) Field of Classification Search ................. 359/296; 430/32; 345/107
See application file for complete search history.

(56) References Cited

U.S. PATENT DOCUMENTS 4,267,215 A  5/1981  Riggs 6,816,146 B2 *  11/2004  Harada et al. ............... 345/107
6,831,769 B2 *  12/2004  Holman et al. ............. 359/296
6,982,178 B2 *  1/2006  LeCain et al. ................. 438/22

FOREIGN PATENT DOCUMENTS

| JP | 5-53553 | 8/1993 |
| JP | 2002-526812 | 8/2002 |
| JP | 2002-365668 | 12/2002 |
| JP | 2002365668 A * | 12/2002 |
| WO | 00/20922 | 4/2000 |

OTHER PUBLICATIONS

Partial English translation of Office Action issued Dec. 12, 2008 in Chinese Application No. 200510074299.6 corresponding to the present U.S. application.

* cited by examiner

*Primary Examiner*—William C Choi
(74) *Attorney, Agent, or Firm*—Wenderoth, Lind & Ponack, L.L.P.

(57) ABSTRACT

A process for producing a sheet for electrophoretic display including steps of: (a) continuously running a strip-shaped substrate sheet in which an electrically conductive layer is formed on a substrate film, and coating, on the substrate sheet, a coating solution containing a microcapsule for electrophoretic display, using a coating apparatus of a kiss reverse coating system having a coating roll in which a gravure pattern is discontinuously formed in an axial direction of an external circumferential surface; and (b) drying the coating solution to form a layer containing the microcapsule on the electrically conductive layer to obtain a sheet for electrophoretic display in which a microcapsule supporting part on which the microcapsule is supported, and an electrically conductive layer exposing part on which the electrically conductive layer is exposed are alternatively arranged in a width direction of the sheet.

15 Claims, 6 Drawing Sheets

(a)

(b)

PROCESS FOR PRODUCING SHEET FOR ELECTROPHORETIC DISPLAY, SHEET FOR ELECTROPHORETIC DISPLAY, AND ITS USE

BACKGROUND OF THE INVENTION

1. Field of the Invention

The present invention relates to a process for producing a sheet for electrophoretic display, a sheet for electrophoretic display and its use.

2. Description of the Related Art

An electrophoretic display device displays various data such as character data and image data by behavior of electrified fine particles when a voltage is applied, the electrified fine particles being, for example, dispersed in a dispersing medium. If the electrified fine particles and the dispersing medium are colored in different colors, when the electrified fine particles migrate to the surface of the dispersing medium by voltage application, a color of the electrified fine particles is observed and, when the electrified fine particles migrate to the bottom of the dispersing medium, a color of the dispersing medium is observed. If many electrodes which can apply a voltage by addressing are provided, different colors can be displayed every address, and any character data or image data can be displayed. The display data can be renewed and, at the same time, if an electric signal has not disappeared, the display data can be retained as they are.

As the electrophoretic display devices, in addition to stationary devices such as ordinary displays, some techniques of flexible displays have been proposed, such as electronic papers and electronic books, which have the shape of a thin sheet, which are ultraportable, and which can freely be bended.

For such electrophoretic display devices, there has been proposed a technique of microcapsulating a dispersion of electrified fine particles, that is, a dispersion for electrophoretic display. A dispersion for electrophoretic display is encapsulated in fine spherical microcapsules composed of a transparent resin or the like, and the resulting microcapsules for electrophoretic display are supported on the surface of a substrate sheet. Thus, a sheet-shaped electrophoretic display device having flexibility can easily be obtained. The dispersion for electrophoretic display is not locally distributed, or does not move, and this becomes a technique suitable for utility in which posture at use is variously changed, or display devices are bended, such as electronic papers.

In order to prepare a sheet for electrophoretic display utilizing such a microcapsule technique, various coating techniques are employed. As a means for coating microcapsules for electrophoretic display, there have been known, for example, a die coater and an air knife coater.

As a technique of coating various coating solutions with high productivity on an industrial scale, there has previously been known the roll coater technique of holding a substrate sheet between a pair of rolls to run the sheet, and transferring a coating solution, which has been attached to one side roll, to the substrate sheet. There has also been known a gravure coater using a gravure roll in which a gravure pattern consisting of fine irregularities is formed on a coating roll. The gravure coater has also been utilized in coating or printing on a pattern.

The microcapsules for electrophoretic display are desired to be supported substantially in a monolayer form and substantially densely on a substrate sheet. If two or more microcapsules are overlaid with each other, or if there is a great gap between microcapsules, unevenness in display properties or display pixel missing may occur, and this may greatly reduce display quality.

Further, as a sheet for electrophoretic display, microcapsules are supported on the entire surface of a substrate sheet, or alternatively, microcapsules are not present on a part of the surface, and the surface of the substrate sheet, or an electrode or an electrically conductive layer formed on the surface of the substrate sheet are exposed. Examples thereof may include the case where one wants to display character data or image data only on a part of the surface of a substrate sheet, the case where one wants to utilize a part of a substrate sheet for a purpose other than display, and the case where one wants to provide an electrode terminal for connecting wiring for applying a voltage to a sheet for electrophoretic display. In this manner, in order to support microcapsules only on a part of the surface of a substrate sheet in a prescribed pattern shape, some device is necessary.

For example, Japanese Patent Application Publication No. 2002-526812 discloses a technique of supporting microcapsules for electrophoretic display on the surface of a substrate sheet by a slot die coating method or an air knife coating method. In addition, Japanese Patent Application Publication No. 2002-365668 discloses a technique of supporting two or more kinds of microcapsules for electrophoretic display on a prescribed pattern position on a substrate utilizing photolithography technique. In this technique, a photoresist material is blended in a microcapsule dispersion, and a layer of the microcapsule dispersion coated is pattern-formed on a substrate.

However, by the above producing technique, it was difficult to prepare, with high productivity, a high quality sheet for electrophoretic display in which microcapsules for electrophoretic display are arranged in a prescribed pattern shape. In particular, in a type of usage such as electronic papers, it is required that a stable high quality sheet for electrophoretic display is produced on a large scale from an economical viewpoint, but there has been found no technique which is suitable for such an industrial production.

For example, in a gravure coater, it is difficult to coat a thick film. When a gravure roll having great irregularities of a gravure pattern is used, a trace of a gravure pattern remains on a microcapsule coated film which has been coated on a substrate sheet, and thus, it is difficult to coat microcapsules uniformly. In addition, a gravure roll is strongly brought into contact with a substrate sheet, so that an electrically conductive layer formed on a substrate sheet may easily be damaged.

In an air knife coating method employed in the technique of Japanese Patent Application Publication No. 2002-526812, microcapsules cannot be supported only on a part of a sheet surface. In a slot die coating method, although microcapsules can be supported in a pattern manner by devising a slot shape, in order to discharge a microcapsule coating solution through a narrow slot die, it is necessary to use a pump having a high discharge precision, and microcapsules passing through such a pump having a high discharge precision may easily be damaged. If microcapsules undergo some damage, they do not function as an electrophoretic display device.

The technique of Japanese Patent Application publication No. 2002-365668 utilizes a photolithography technique in order to arrange microcapsules for electrophoretic display in a pattern manner, and therefore, it is suitable for fine pattern formation. However, it requires complicated apparatuses or facilities and treating steps, so that producing efficiency becomes low and the cost of production becomes increased.

Under these circumstances, it is an object of the present invention to provide a process for producing a sheet for electrophoretic display which can support, with high efficiency, microcapsules for electrophoretic display only on a part of the surface of a substrate sheet in a precise pattern shape, a sheet for electrophoretic display obtained by the process, and its use.

In addition to the above problems, in the pervious producing technique, there is also a problem that it is difficult to handle the resulting sheet for electrophoretic display.

As described above, if a microcapsule coating solution is coated, and sheets for electrophoretic display immediately after drying are, as they are, wound in a roll manner, or overlaid, a microcapsule layer is brought into contact with the surface of a substrate sheet of an adjacent sheet for electrophoretic display, and microcapsules may easily cause blocking against the substrate sheet. When one tries to pull out a sheet for electrophoretic display from a wound roll in order to use it, microcapsules attached to the back of a substrate sheet may be damaged or detached.

Thus, it was contemplated that, when a sheet for electrophoretic display is wound in a roll manner, a releasing agent is coated on the surface of a microcapsule layer. In addition, it was contemplated that a sheet for electrophoretic display is wound by putting a sheet with a releasing agent coated thereon between the layers of the sheet for electrophoretic display. It was contemplated that this can avoid blocking between the microcapsules and the back of a substrate sheet and, when a sheet for electrophoretic display is pulled out from a wound roll, the microcapsules may easily be separated from the back of a substrate sheet, and the microcapsules cannot be damaged.

However, a problem arises that when one tries to use a sheet for electrophoretic display by attaching another member to the surface of the sheet on which side a microcapsule layer is formed, while a releasing agent is attached on a microcapsule surface, sufficient adhesiveness or attachment strength cannot be obtained due to the action of a releasing agent.

Therefore, it is another object of the present invention to provide a sheet for electrophoretic display having excellent handling properties such that, when the resulting sheet for electrophoretic display is used by pulling out from a wound roll, microcapsules cannot be damaged, and the sheet for electrophoretic display can easily be attached to another member.

SUMMARY OF THE INVENTION

In order to solve the above problems, the present inventors have intensively studied. As a result, they have found that, by using a coating apparatus of the kiss reverse coating system having a coating roll on which a gravure pattern is formed discontinuously in an axial direction of an external circumferential surface, microcapsules for electrophoretic display can be arranged, with high efficiency, only on a part of the surface of a substrate sheet in a precise pattern shape and, by attaching a release film to the resulting sheet for electrophoretic display, not only surface protection becomes easy, but also handling in the production, as well as storage and transport become easy and, moreover, the surface of the sheet can be smoothened, thereby completing the present invention.

Thus, the present invention provides a process for producing a sheet for electrophoretic display in which a layer containing a microcapsule for electrophoretic display is formed on an electrically conductive layer of a substrate sheet with the electrically conductive layer formed on a substrate film, the process comprising steps of: (a) continuously running a strip-shaped substrate sheet in which an electrically conductive layer is formed on a substrate film, and coating, on the substrate sheet, a coating solution containing a microcapsule for electrophoretic display, using a coating apparatus of the kiss•reverse coating system having a coating roll in which a gravure pattern is discontinuously formed in an axial direction of an external circumferential surface; and (b) after the step (a), drying the coating solution to form a layer containing the microcapsule on the electrically conductive layer to obtain a sheet for electrophoretic display in which a microcapsule supporting part on which the microcapsule is supported, and an electrically conductive layer exposing part on which the electrically conductive layer is exposed are alternately arranged in a width direction of the sheet.

In one preferred embodiment of the above process for producing an electrophoretic display, in the step (a), a coating solution containing a microcapsule for electrophoretic display having an average particle diameter of 20 to 200 μm may be coated on the substrate sheet.

In another preferred embodiment of the above process for producing an electrophoretic display, in the step (b), the thickness of the layer containing the microcapsule may be 10 to 100 μm as expressed by a thickness after drying.

In still another preferred embodiment, the above process for producing a sheet for electrophoretic display may further comprise a step of (c) after the step (b), attaching a release film to the layer containing the microcapsule, and winding the resulting sheet.

The present invention further provides a sheet for electrophoretic display in which a layer containing a microcapsule for electrophoretic display is formed on an electrically conductive layer of a substrate sheet with the electrically conductive layer formed on a substrate film, the sheet comprising a microcapsule supporting part on which the microcapsule is supported, and an electrically conductive layer exposing part on which the electrically conductive layer is exposed, both parts being alternately arranged in a width direction of the sheet.

In one preferred embodiment of the above sheet for electrophoretic display, a release film may be attached to the surface of the sheet on which side the layer containing the microcapsule is formed.

The present invention further provides an electrophoretic display device comprising a data displaying part, wherein the data displaying part comprises the above sheet for electrophoretic display.

The present invention further provides an electronic equipment comprising a data displaying means, wherein the data displaying means comprises the above electrophoretic display device.

The process for producing a sheet for electrophoretic display according to the present invention makes it possible to produce a sheet for electrophoretic display in which microcapsules for electrophoretic display are arranged on a substrate sheet in a prescribed pattern shape at an industrial scale with high productivity. In the resulting sheet for electrophoretic display, the pattern shape of the microcapsules for electrophoretic display formed on the substrate sheet is precise, boundaries are clear, and no protrusion is present, and quality is high. Therefore, an electrophoretic display device and an electronic equipment using the sheet have neither unevenness of display properties nor display pixel missing, and have extremely excellent display quality.

When a release film is attached to a layer containing microcapsules for electrophoretic display, damage or detachment of the microcapsules for electrophoretic display, and leakage of a dispersion for electrophoretic display can effectively be prevented, handling in the production becomes easy, storage and transport in a wound roll form become possible and, further, the surface of the sheet becomes very smooth, therefore, attachment becomes better in the attachment to another member.

DETAILED DESCRIPTION OF THE PREFERRED EMBODIMENTS

Figure 1:
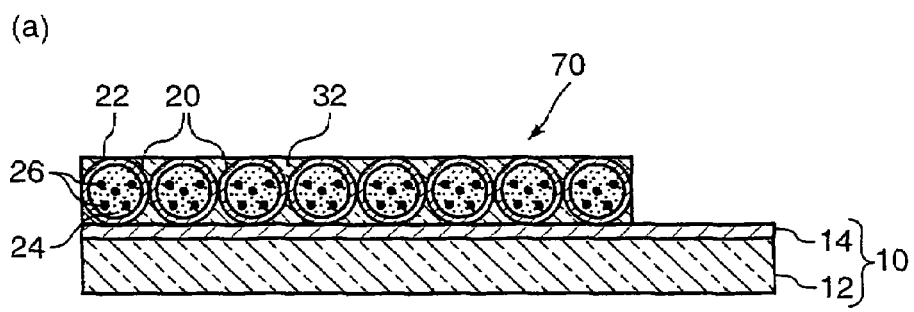
FIG. 1 is a cross-sectional view (a) and a plane view (b) schematically showing one example of the sheet for electrophoretic display according to the present invention.
Figure 1:
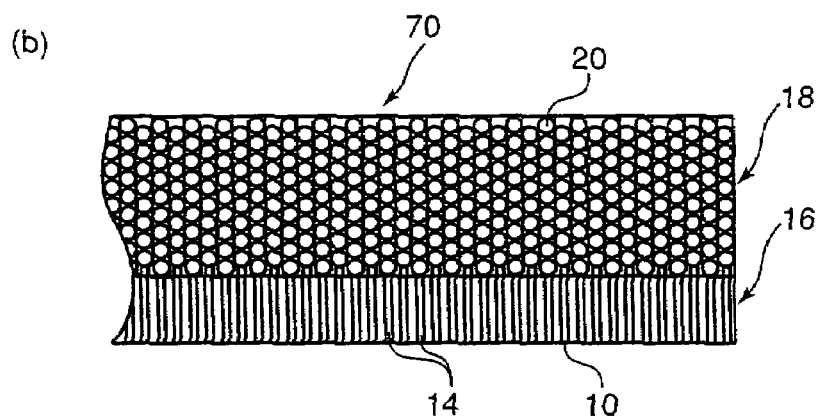

The process for producing a sheet for electrophoretic display, the sheet for electrophoretic display, and its use according to the present invention will be described below in detail and in specific terms; however, the scope of the present invention is not limited to these descriptions. The present invention can also be practiced after appropriate alteration or modification in such a range that the gist of the present invention is not deviated, regarding embodiments other than described below, and all of them are included in the scope of the present invention.

<<<<General Description>>>>

The process for producing a sheet for electrophoretic display according to the present invention is a process for producing a sheet for electrophoretic display in which a layer containing microcapsules for electrophoretic display is formed on an electrically conductive layer of a substrate sheet with the electrically conductive layer formed on a substrate film, the process comprising steps of: (a) continuously running a strip-shaped substrate sheet in which an electrically conductive layer is formed on a substrate film, and coating, on the substrate sheet, a coating solution containing microcapsules for electrophoretic display, using a coating apparatus of the kiss system and the reverse system (hereinafter referred to as the "kiss•reverse coating system" in some cases) having a coating roll in which a gravure pattern is discontinuously formed in an axial direction of an external circumferential surface; and (b) after the step (a), drying the coating solution to form a layer containing the microcapsules on the electrically conductive layer to obtain a sheet for electrophoretic display in which microcapsule supporting parts on which the microcapsules are supported, and electrically conductive layer exposing parts on which the electrically conductive layer is exposed are alternately arranged in the width direction of the sheet. As used herein, the term "microcapsule for electrophoretic display" refers to a microcapsule in which a dispersion for electrophoretic display is encapsulated in a capsule shell, and the term "dispersion for electrophoretic display" refers to a dispersion containing electrophoretic particles in a dispersing medium.

<<Electrophoretic Particle>>

In the present invention, the term "electrophoretic particle" refers to a solid particle having electrophoretic properties in a dispersing medium, that is, a solid particle which has either a positive charge or a negative charge in a dispersing medium and which substantially migrates in the dispersing medium in response to an external electric field. When a solid particle having no electrophoretic properties in a dispersing medium or having insufficient electrophoretic properties is used as an electrophoretic particle, if necessary, sufficient electrophoretic properties may be given to the solid particle, for example, by any of the previously known methods, such as treatment with a coupling agent having an electrifiable group.

As a solid particle forming an electrophoretic particle, although it is not particularly limited, for example, a pigment particle is used. Alternatively, a polymer particle colored with a dye, or a polymer particle containing a pigment may also be used. These solid particles may be used alone, or two or more kinds of them may be used in combination. In these solid particles, preferred are pigment particles.

Examples of the pigment particle used in a solid particle forming an electrophoretic particle may include solid particles made of inorganic pigments such as titanium oxide, barium sulfate, zinc oxide, and Chinese white as the white color series; inorganic pigments such as yellow iron oxide, cadmium yellow, titanium yellow, and chrome yellow, and organic pigments including insoluble azo compounds such as fast yellow, fused azo compounds such as chromophthal yellow, azo complex salts such as benzimidazolone azo yellow, fused polycycles such as flavans yellow, hanza yellow, naphthol yellow, nitro compounds, and pigment yellow as the yellow color series; inorganic pigments such as molybdate orange, and organic pigments including azo complex salts such as benzimidazolone azo orange, and fused polycycles such as perynone orange as an orange color series; inorganic pigments such as Indian red and cadmium red, and organic pigments including color lakes such as mada lake, soluble azo compounds such as lake red, insoluble azo compounds such as naphthol red, fused azo compounds such as chromophthal scarlet, fused polycycles such as thioindigo Bordeaux, quinacridone pigments such as Cinquacia red Y and hostarparm red, and azo pigments such as permanent red and fast slow red as the red color series; inorganic pigments such as manganese violet, and organic pigments including color lakes such as Rhodamine lake, and fused polycycles such as dioxazine violet as the violet color series; inorganic pigments such as Prussian blue, ultramarine, cobalt blue, and cerulean blue, and organic pigments including phthalocyanines such as phthalocyanine blue, indanthrenes such as indanthrene blue, and alkali blue as the blue color series; inorganic pigments such as emerald green, chrome green, chromium oxide, and viridian, and organic pigments including azo complex salts such as nickel azo yellow, nitroso compounds such as pigment green, and naphthol green, and phthalocyanines such as phthalocyanine green as the green color series; inorganic pigments such as carbon black, titanium black, and iron black, and organic pigments such as aniline black as the black color series. These solid particles may be used alone, or two or more kinds of them may be used in combination. In these solid particles, preferred are solid particles made of white color series pigments such as titanium oxide, and solid particles made of black color series pigments such as carbon black and titanium black.

When titanium oxide is used, although the kind of titanium oxide is not particularly limited, titanium oxide of any type may be used, so far as it is widely used as a white color series pigment. For example, titanium oxide of either the rutile type or the anatase type may be used and, taking into consideration the color fading of a coloring agent due to photocatalyst activity, preferred is titanium oxide of the rutile type having lower photocatalyst activity. In order to further reduce photocatalyst activity, more preferred is titanium oxide which has been subjected to Si treatment, Al treatment, Si—Al treatment, or Zn—Al treatment.

When a polymer particle is used in a solid particle forming an electrophoretic particle, examples of the constituent polymer thereof, although it is not particularly limited, may include polyolefin polymers, poly(halogenated olefin) polymers, polyester polymers, polyurethane polymers, polystyrene polymers, acrylic polymers, epoxy polymers, melamine polymers, and urea polymers. As used herein, the term "polymer" includes a homopolymer and a copolymer obtained by copolymerization of a monomer(s) with a small amount of a copolymerizable monomer(s). These polymer particles may be used alone, or two or more kinds of them may be used in combination. Examples of the dye which colors these polymer particles may include those dyes listed below as a dye which can be added to such a dispersing media as described below. In addition, examples of the pigment to be contained in these polymer particles may include those pigments listed above as a pigment which is used in a solid particle forming an electrophoretic particle.

The average particle diameter of electrophoretic particles, although it is not particularly limited, may preferably have a lower limit of 0.1 µm, more preferably 0.2 µm, and an upper limit of 5 µm, more preferably 3 µm, as expressed in volume average particle diameter. When the electrophoretic particles have an average particle diameter of smaller than 0.1 µm, they cannot have a sufficient degree of chroma, and when used in an electrophoretic display device, contrast may be reduced, so that display may become unclear. In contrast, when the electrophoretic particles have an average particle diameter of greater than 5 µm, they may be necessary to raise the coloring degree of the particles themselves more than as needed, the amount of a pigment to be used may be increased, the rapid migration of the electrophoretic particles may become difficult at a part to which a voltage is applied for displaying, and their speed of response (display responsiveness) may be decreased.

When electrophoretic particles are dispersed in a dispersing medium (i.e., a solvent for dispersing the electrophoretic particles when used in an electrophoretic display device), a zeta potential exhibited by their dispersion, although it is not particularly limited, may preferably be 30 mV or higher, more preferably 40 mV or higher, and still more preferably 50 mV or higher, as expressed in absolute value. The zeta potential may be positive or negative, which is not particularly limited, so far as the absolute value thereof is great. When the absolute value of a zeta potential is 30 mV or higher, display properties such as display responsiveness and contrast may greatly be improved in the case where the electrophoretic particles are used in an electrophoretic display device.

The electrophoretic particles may be those having either a positive zeta potential or a negative zeta potential exhibited by their dispersion in a dispersing medium, when used in a one-particle-type electrophoretic display device, or may be a combination of those having a positive zeta potential exhibited by their dispersion in a dispersing medium and those having a negative zeta potential exhibited by their dispersion in a dispersing medium, when used in a two-particle-type electrophoretic display device. In the case of a two-particle-type electrophoretic display device, it is necessary that these electrophoretic particles should have different optical reflection properties such as color tone for the improvement of contrast.

The electrophoretic particles may be dispersed, as they are, in a dispersing medium used in a dispersion for electrophoretic display, or may be dispersed after surface treatment is carried out by reacting their surfaces with a coupling agent or by coating their surfaces with a polymer. In this case, it is preferred that a solid particle forming an electrophoretic particle is a pigment particle and the pigment particle is surface treated with a coupling agent or a polymer. In the present invention, an electrophoretic particle which has been surface treated in this manner may simply be referred to as an electrophoretic particle.

The surface treated electrophoretic particles may be isolated as the electrophoretic particles, or when the same kind of dispersing medium as the dispersing medium used in a dispersion for electrophoretic display is used for the surface treatment, a dispersion obtained after the surface treatment may be used for the production of a dispersion for electrophoretic display, as it is, or after the addition of an appropriate dispersing medium thereto, followed by sufficient mixing. For isolating the electrophoretic particles, for example, a dispersion obtained after the surface treatment is centrifuged, the supernatant is discarded, and only the settled substance may be recovered as the electrophoretic particles. Further, a procedure of re-dispersing the thus obtained electrophoretic particles in a dispersing medium, centrifuging this, and recovering only the settled substance is carried out at least once, preferably two or more times, more preferably three or more times, to wash the electrophoretic particles. The conditions of centrifugation, although they are not particularly limited, may appropriately be set depending on an apparatus to be used. Ordinary conditions may be used, for example, 10,000 G and 15 to 30 minutes, which are used when a dispersion of fine particles is centrifuged and the settled powder is recovered.

<Coupling Agent>

As a coupling agent, which is allowed to react with the surface of an electrophoretic particle, there can be used a coupling agent having an electrifiable group, a coupling agent having a long chain alkyl group, or a coupling agent having an electrifiable group and a long chain alkyl group. When a coupling agent having an electrifiable group is used, such an effect can be obtained that the electrifiable properties of electrophoretic particles can be enhanced, the rapid migration of the electrophoretic particles can become easy at a part to which a voltage is applied for displaying, and their speed of response (display responsiveness) can be increased.

Examples of the coupling agent having an electrifiable group may include 3-aminopropyltriethoxysilane, 3-aminopropylmethyldiethoxysilane, 3-ureidopropyltriethoxysilane, 3-ureidopropyltrimethoxysilane, 3-aminopropyltrimethoxysilane, 3-aminopropyl-tris(2-methoxy-ethoxy-ethoxy)silane, N-methyl-3-aminopropyltrimethoxysilane, N-aminoethyl-3-aminopropyltrimethoxysilane, diaminosilane, N-aminoethyl-3-aminopropylmethyldimethoxysilane, triaminopropyltrimethoxysilane, 3-chloropropyltriethoxysilane, 3-chloropropyltrimethoxysilane, 3-cyanopropyltriethoxysilane, vinyltrichlorosilane, vinyltriethoxysilane, vinyltrimethoxysilane, vinyltri(2-methoxyethoxy)silane, hexamethyldisilazane, γ-aminopropyltrimethoxysilane, γ-aminopropyltriethoxysilane, N-phenyl-γ-aminopropyltrimethoxysilane, phenyltrimethoxysilane, phenyltriethoxysilane, methyltri(methacryloyloxyethyl)silane, methyltri(glycidyloxy)silane, 3-glycidoxypropyldimethoxysilane, 2-(3,4-epoxycyclohexyl)ethyltrimethoxysilane, 3-methacryloxypropyltrimethoxysilane, γ-(2-aminoethyl)aminopropylmethyldimethoxysilane, N-β-(N-vinylbenzylaminoethyl)-γ-aminopropyltrimethoxy silane hydrochloride, octadecyldiemthyl[3-(trimethoxysilyl)propyl] ammonium chloride, γ-chloropropylmethyldichlorosilane, trimethylchlorosilane, dimethyldichlorosilane, methyltrichlorosilane, methyldichlorosilane, dimethylchlorosilane, dimethylvinylchlorosilane, methylvinyldichlorosilane, methylchlorodisilane, triphenylchlorosilane, methyldiphenylchlorosilane, diphenyldichlorosilane, methylphenyldichlorosilane, phenyltrichlorosilane, chloromethyldimethylchlorosilane hexamethyldisilazane, isopropyltri(n-aminoethyl-aminoethyl) titanate, tetraisopropylbis (dioctylphosphite) titanate, tetraoctylbis (ditridecylphosphite) titanate, tetra(2,2-diallyloxymethyl-1-butyl)bis(ditridecyl)-phosphite titanate, and trifluoropropyltrimethoxysilane. These coupling agents may be used alone, or two or more kinds of them may be used in combination.

Examples of the coupling agent having a long chain alkyl group may include propyltrimethoxysilane, butyltrimethoxysilane, hexyltrimethoxysilane, decyltrimethoxysilane, dodecyltrimethoxysilane, hexadecyltrimethoxysilane, octadecyltrimethoxysilane, propyldodecyltrichlorosilane, butyltrichlorosilane, hexyltrichlorosilane, decyltrichlorosilane, dodecyltrichlorosilane, hexadecyltrichlorosilane, octadecyltrichlorosilane, isopropyltriisostearoyl titanate, isopropyltrioctanoyl titanate, and acetoalkoxyaluminum diisopropionate. These coupling agents may be used alone, or two or more kinds of them may be used in combination. In these coupling agents, preferred are decyltrimethoxysilane, dodecyltrimethoxysilane, hexadecyltrimethoxysilane, octadecyltrimethoxysilane, propyldodecyltrichlorosilane, decyltrichlorosilane, dodecyltrichlorosilane, hexadecyltrichlorosilane, octadecyltrichlorosilane, isopropyltriisostearoyl titanate, isopropyltrioctanoyl titanate, and acetoalkoxyaluminum diisopropionate.

Examples of the coupling agent having an electrifiable group and a long chain alkyl group may include octadecyldimethyl-3-(trimethoxysilyl) propylammoniumchloride, dodecafluorooctyltrichlorosilane, isopropyltridodecylbenzenesulfonyl titanate, isopropyl(dioctylsulfate) titanate. These coupling agents may be used alone, or two or more kinds may be used jointly. In these coupling agents, preferred are octadecyldimethyl-3-(trimethoxysilyl)propylammonium chloride, and dodecafluoroocytltrichlorosilane.

Examples of the method of reacting the surface of an electrophoretic particle with a coupling agent may include a method of placing a dispersing medium, electrophoretic particles, and a coupling agent into an ultrasound bath, and carrying out ultrasound dispersing while stirring; a method of carrying out dispersing using a dispersing apparatus such as a paint shaker, a ball mill, and a sand grinding mill; a dry method of spraying a coupling agent with dry air or a nitrogen gas while forcibly stirring a dispersing medium and electrophoretic particles with a V blender or the like; a wet method of appropriately dispersing electrophoretic particles in a dispersing medium to obtain a slurry, to which a coupling agent is added; and a spraying method of spraying a coupling agent while vigorously stirring a pre-warmed dispersing medium and electrophoretic particles.

<Coating Polymer>

When the surface of an electrophoretic particle is coated with a polymer, such an effect can be obtained that the dispersibility into a dispersing medium and the moisture resistance of the electrophoretic particle can be improved. Examples of the polymer to coat the surface of an electrophoretic particle may include polyolefin polymers, poly(halogenated olefin) polymers, polyester polymers, polyurethane polymers, polystyrene polymers, acrylic polymers, epoxy polymers, melamine polymers, and urea polymers. As used herein, the term "polymer" includes a homopolymer and a copolymer obtained by copolymerization of a monomer(s) with a small amount of a copolymerizable monomer(s). There polymers may be used alone, or two or more kinds of them may be used in combination.

In particular, when the surface of an electrophoretic particle is coated with a polymer which is formed by radical polymerization, there can be used a polymerizable monomer having a reactive group, a polymerizable monomer having an electrifiable group, a polymerizable monomer having a long chain alkyl group, and other polymerizable monomers.

Examples of the polymerizable monomer having a reactive group may include polymerizable monomers each having an aziridine group, such as those represented by the following formulas:

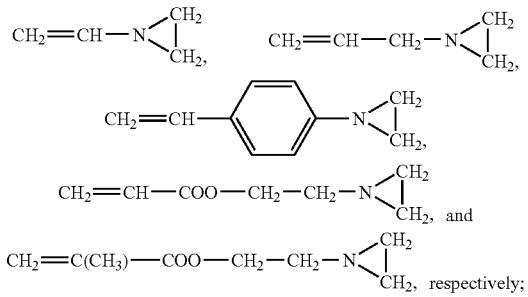

polymerizable monomers each having an oxazolidine group, such as 2-vinyl-2-oxazolidine, 2-vinyl-4-methyl-oxazolidine, 2-vinyl-5-methyl-2-oxazolidne, 2-vinyl-4-ethyl-2-oxazolidine, 2-vinyl-5-ethyl-2-oxazolidine, 2-isopropenyl-2-oxazolidine, 2-isopropenyl-4-methyl-2-oxazolidine, 2-isopropenyl-5-methyl-2-oxazolidine, 2-isopropenyl-4-ethyl-2-oxazolidine, 2-isopropenyl-5-ethyl-2-oxazolidine, and 2-isopropenyl-4,5-dimethyl-2-oxazolidine; acrylic acid amide; methacrylic acid amide; polymerizable monomers each having a N-hydroxyalkylamido group, such as N-hydroxymethylacrylamide, N-hydorxyethylacrylamide, N-hydroxybutylacrylamide, N-hydroxyisobutylacrylamide, N-hydroxy-2-ethylhexyalacrylamide, N-hydroxycyclohexylacrylamide, N-hydroxyethylmethacrylamide, N-hydroxyethylmethacrylamide, N-hydroxybutylmethacrylamide, N-hydroxyisobutylmethacyrlamide, N-hydroxy-2-ethyl-hexylmethacyrlamide, and N-hydroxycyclohexylmethacrylamide; polymerizable monomers each having an epoxy group, such as those represented by the following formulas:

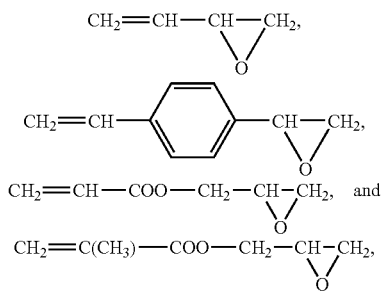

respectively; polymerizable monomers each having a thioepoxy group (or an episulfide group), such as those represented by the following formulas:

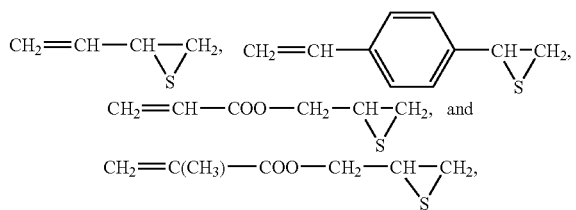

respectively; polymerizable monomers each having an isocyanato group, such as those represented by the following formulas:

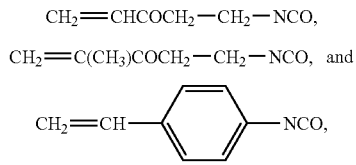

respectively. These polymerizable monomers may be used alone, or two or more kinds of them may be used in combination.

Examples of the polymerizable monomer having an electrifiable group may include chlorostyrene, styrenesulfonic acid, acrylic acid, trifluoroethylene acrylate, nitrile acrylate, methacrylic acid, trifluoroethylene methacrylate, nitrile methacrylate, glycidyl acrylate, glycidyl methacrylate, tert-butylaminomethyl methacrylate, dimethylaminomethylacrylate, dimethylaminomethyl methacrylate, chlorohydroxypropyl acrylate, chlorohydroxypropyl methacrylate, trichloroethyl acrylate, and trichloroethyl methacrylate. These polymerizable monomers may be used alone, or two or more kinds of them may be used in combination.

Examples of the polymerizable monomer having a long chain alkyl group may include pentyl acrylate, isopetyl acrylate, neopentyl acrylate, hexyl acrylate, octyl acrylate, decyl acrylate, undecyl acrylate, dodecyl acrylate, lauryl acrylate, stearyl acrylate, hexadecyl acrylate, heptadecyl acrylate, nonadecyl acrylate, arakyl acrylate, behenyl acrylate, heptacyl acrylate, nonacyl acrylate, doteriacyl acrylate, pentyl methacrylate, isopentyl methacrylate, neopentyl methacrylate, hexyl methacrylate, octyl methacrylate, decyl methacrylate, undecyl methacrylate, dodecyl methacrylate, lauryl methacrylate, stearyl methacrylate, hexadecyl methacrylate, heptadecyl methacrylate, nonadecyl methacrylate, arakyl methacrylate, benehyl methacrylate, heptacyl methacrylate, nonacyl methacrylate, and doteriacyl methacrylate. These polymerizable monomers may be used alone, or two or more kinds of them may be used in combination.

Examples of other polymerizable monomers may include styrene monomers such as styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, and p-chlorostyrene; ethylene, propylene, butylenes, vinyl chloride, methyl acrylate, ethyl acrylate, propyl acrylate, n-butyl acrylate, isobutyl acrylate, methyl methacrylate, ethyl methacrylate, propyl methacrylate, n-butyl methacrylate, and isobutyl methacrylate. These polymerizable monomers may be used alone, or two or more kinds of them may be used in combination.

Examples of the method of coating the surface of an electrophoretic particle with a polymer may include a method of suspension polymerizing a polymerizable monomer as described above in a state where solid particles forming electrophoretic particles are dispersed in an appropriate solvent. In this case, if the surface of a solid particle is treated with a coupling agent as described above prior to the suspension polymerization, a polymerizable monomer can be reacted with high efficiency on the surface of the solid particle, which is preferred.

<<Dispersion for Electrophoretic Display>>

The electrophoretic particles can be used in a dispersion for electrophoretic display by dispersing them in a dispersing medium. The dispersion for electrophoretic display may comprise electrophoretic particles each having either a positive zeta potential or a negative zeta potential exhibited by their dispersion when dispersed in a dispersing medium in the case where the dispersion is used in a one-particle-type electrophoretic display device, or may comprise a combination of electrophoretic particles each having a positive zeta potential exhibited by their dispersion when dispersed in a dispersing medium and electrophoretic particles each having a negative zeta potential exhibited by their dispersion when dispersed in a dispersing medium in the case where the dispersion is used in a two-particle-type electrophoretic display device.

The concentration of electrophoretic particles in a dispersion (percent by weight of the particles, based on the weight of the dispersion) may preferably have a lower limit of 1% by weight, more preferably 2% by weight, still more preferably 5% by weight, and an upper limit of 25% by weight, more preferably 23% by weight, still more preferably 20% by weight. When the concentration of electrophoretic particles is lower than 1% by weight, the electrophoretic particles cannot have a sufficient degree of chroma, and when used in an electrophoretic display device, contrast may be reduced, so that display may become unclear. In contrast, when the concentration of electrophoretic particles is higher than 60% by weight, the dispersion may have an increased viscosity, so that dispersion treatment becomes difficult, and the electrophoretic particles may cause aggregation at a part to which a voltage is applied for displaying, so that their speed of response (display responsiveness) may be decreased.

<Dispersing Medium>

As a dispersing medium in which electrophoretic particles are to be dispersed, although it is not particularly limited, there can be used any of the previously known dispersing mediums which are widely used in a dispersion for electrophoretic display. For example, organic solvents are preferred.

Examples of the organic solvent used as a dispersing medium may include aromatic hydrocarbons including benzene hydrocarbons such as benzene, toluene, o-xylene, m-xylene, p-xylene, mixed xylene, ethylbenzene, hexylbenzene, dodecylbenzene, and phenylxylylethane; aliphatic hydrocarbons including paraffin hydrocarbons such as n-hexane and n-decane, isoparaffin hydrocarbons such as ISOPAR (available from Exxon), olefin hydrocarbons such as 1-octene and 1-decene, and naphthene hydrocarbons such as cyclohexane and decalin; petroleum or coal-derived hydrocarbon mixtures such as kerosene, petroleum ether, petroleum benzine, ligroin, industrial gasoline, coal tar naphtha. petroleum naphtha, and solvent naphtha; esters such as ethyl acetate and butyl acetate; ketones such as acetone, methyl ethyl ketone, and methyl isobutyl ketone; alcohols such as methanol, ethanol, isopropanol, octanol, and methylcellosolve; halogenated hydrocarbons such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodoethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicone oils such as dimethylsilicone oil and methylphenylsilicone oil; fluorine solvents such as hydrofluoroether; carbon disulfide. These organic solvents may be used alone, or two or more kinds of them may be used in combination. In these organic solvents, preferred are hexylbenzene, long chain alkylbenzene such as dodecylbenzene, and phenylxylylethane because of their high boiling points and flash points and their little toxicity.

The amount of a dispersing medium to be used, although it is not particularly limited, may preferably have a lower limit of 40% by weight, more preferably 50% by weight, still more preferably 60% by weight, and an upper limit of 95% by weight, more preferably 92% by weight, still more preferably 90% by weight, based on the total amount of the resulting dispersion. When the amount of a dispersing medium to be used is lower than 40% by weight, the viscosity of a dispersion may be increased, so that the electrophoretic properties of electrophoretic particles may be deteriorated. In contrast, when the amount of a dispersing medium to be used is higher than 95% by weight, the concentration of electrophoretic particles may be decreased, so that when used in an electrophoretic display device, display properties such as contrast may be deteriorated.

The dispersing medium may preferably be colored with a dye or the like for the purpose of enhancing contrast to electrophoretic particles when a dispersion for electrophoretic display containing the electrophoretic particles in the dispersing medium is used in a one-particle-type electrophoretic display device. In contrast, when used in a two-particle-type electrophoretic display device, the dispersing medium may preferably be colorless and transparent so that it does not deteriorate optical reflection properties such as contrast of at least two kinds of electrophoretic particles having different tones.

<Dye>

When a dispersing medium is colored, a dye used in coloring, although it is not particularly limited, may preferably be any of oil-soluble dyes. In particular, from a viewpoint of easy use, azo dyes and anthraquinone dyes are more preferred. Examples of the azo dye and the anthraquinone dye may include azo compounds such as OIL YELLOW 3G (available from Orient Chemical Industries, Ltd.) as yellow dyes; azo compounds such as FAST ORANGE G (available from BASF AG) as orange dyes; anthraquinones such as MACROLEX BLUE RR (available from Bayer AG) as blue dyes; anthraquinones such as SUMIPLAST GREEN G (available from Sumitomo Chemical Co., Ltd.) as green dyes; azo compounds such as OIL BROWN GR (available from Orient Chemical Industries, Ltd.) as brown dyes; azo compounds such as OIL RED 5303 (available from Arimoto Chemical Co., Ltd.) and OIL RED 5B (available from Orient Chemical Industries, Ltd.) as red dyes; anthraquinones such as OIL VIOLET # 730 (available from Orient Chemical Industries, Ltd.) as violet dyes; azo compounds such as SUDAN BLACK X60 (available from BASF AG) as black dyes, and mixtures of anthraquinone series MACROLEX BLUE FR (available from Bayer AG) and azo series OIL RED XO (available from Kanto Kagaku). These dyes may be used alone, or two or more kinds of them may be used in combination.

The amount of a dye to be used, although it is not particularly limited, may preferably have a lower limit of 0.1 parts by weight, more preferably 0.5 parts by weight, still more preferably 1 part by weight, and an upper limit of 10 parts by weight, based on 100 parts by weight of a dispersing medium. When the amount of a dye to be used is lower than 0.1 parts by weight, the coloring of a dispersing medium may become insufficient, so that sufficient contrast to electrophoretic particles cannot be obtained. In contrast, when the amount of a dye to be used is higher than 10 parts by weight, the dye may be used more than as needed, so that the cost of production may become increased.

The dispersion for electrophoretic display may contain other components, if necessary, in addition to electrophoretic particles and a dispersing medium. Examples of other components may include a dispersant, a charge controller, and a viscosity modifier.

<Dispersant>

The dispersant is used, for example, in order to assist the dispersing of electrophoretic particles in a dispersing medium. Examples of the dispersant which can be added to a dispersion may include anionic surfactants, cationic surfactants, amphoteric surfactants, nonionic surfactants, fluorine surfactants, sorbitan fatty acid ester surfactants such as sorbitan sesquioleate, dispersants such as block polymers and graft polymers, and various coupling agents, which can be dissolved in a dispersing medium. These dispersants may be used alone, or two or more kinds of them may be used in combination.

The amount of a dispersant to be used, although it is not particularly limited, may preferably have a lower limit of 0.1 parts by weight, more preferably 0.2 parts by weight, still more preferably 0.5 parts by weight, and an upper limit of 10 parts by weight, more preferably 8 parts by weight, still more preferably 5 parts by weight, based on 100 parts by weight of a dispersing medium. When the amount of a dispersant to be used is lower than 0.1 parts by weight, the effect of dispersing electrophoretic particles may be small. In contrast, when the amount of a dispersant to be used is higher than 10 parts by weight, the effect of dispersing electrophoretic particles may be saturated and, at the same time, the dispersant may be used more than as needed, so that the cost of production may be increased.

<Charge Controller>

The charge controller is used, for example, in order to adjust the electrophoretic properties of electrophoretic particles in a dispersing medium. Examples of the charge controller which can be added to a dispersing medium may include chromium complexes such as Bontron E-81 (Orient Chemical Industries Co., Ltd.); zinc complexes such as BONTRON E-84 (available from Orient Chemical Industries Co., Ltd.); aluminum complexes such as TONBRON E-88 (available from Orient Chemical Industries Co., Ltd.); phenol condensates such as BONTRON E89 (available from Orient Chemical Industries Co., Ltd.); azine compounds such as BONTRON N-01 (available from Orient Chemical Industries Coo., Ltd.); azochrome complexes such as BONTRON S-34 (available from Orient Chemical Industries Co., Ltd.); and iron complexes such as BONTRON X-11 (available from Orient Chemical Industries Co., Ltd.). These charge controllers may be used alone, or two or more kinds of them may be used in combination.

The amount of a charge controller to be used, although it is not particularly limited, may preferably have a lower limit of 0.01 parts by weight, more preferably 0.05 parts by weight, still more preferably 0.1 parts by weight, and an upper limit of 5.0 parts by weight, more preferably 3.0 parts by weight, still more preferably 2.0 parts by weight, based on 100 parts by weight of a dispersing medium. When the amount of a charge controller to be used is lower than 0.01 parts by weight, the effect of adjusting electrophoretic properties may be small. In contrast, when the amount of a charge controller to be used is higher than 5.0 parts by weight, the effect of adjusting electrophoretic properties may be saturated and, at the same time, the charge controller may be used more than as needed, so that the cost of production may be increased.

<Viscosity Modifier>

The viscosity modifier is used, for example, in order to prevent the settlement of electrophoretic particles in a dispersing medium. Examples of the viscosity modifier which can be added to a dispersing medium may include vegetable oil polymerization compounds such as DISPARON 101 (available from Kusumoto Chemicals, Ltd.), polyether-ester surfactants such as DISPARON 3350 (available from Kusumoto Chemical, Ltd.), hydrogenated castor oil compounds such as DISPARON 305 (available from Kusumoto Chemicals, Ltd.), aliphatic amide waxes such as DISPARON 6500 (available from Kusumoto Chemical, Ltd.), and organic modified smectites such as BENTON 760 (available from Elementis plc). These viscosity modifiers may be used alone, or two or more kinds of them may be used in combination.

When the viscosity modifier is used, the amount of the viscosity modifier to be used, although it is not particularly limited, may preferably have a lower limit of 0.01 parts by weight, more preferably 0.05 parts by weight, still more preferably 0.1 parts by weight, and an upper limit of 10 parts by weight, more preferably 5 parts by weight, still more preferably 1 part by weight, based on 100 parts by weight of a dispersing medium. When the amount of a viscosity modifier to be used is lower than 0.01 parts by weight, the effect of adjusting the viscosity of a dispersion may be small. In contrast, when the amount of a viscosity modifier to be used is higher than 10 parts by weight, the viscosity of a dispersion may become too high.

<<Production of Dispersion for Electrophoretic Display>>

A dispersion for electrophoretic display containing electrophoretic particles in a dispersing medium can be produced by dispersing the electrophoretic particles in the dispersing medium.

The electrophoretic particles may be isolated, and used as a powder, or may be used as a dispersion containing the electrophoretic particles in a prescribed dispersing medium. In the latter case, the term "dispersion" refers to a mixture containing electrophoretic particles in a dispersing medium, and it may be any form ranging from a liquid having a low viscosity to a slurry having a high viscosity. The dispersing medium used in such a dispersion may preferably be the same kind of dispersing medium as a dispersing medium used in a dispersion for electrophoretic display.

As the method of dispersing electrophoretic particles in a dispersing medium, although it is not particularly limited, there can be used any of previously known fine particle dispersing techniques. Examples of the dispersing method may include a method of carrying out dispersing treatment after or during the addition of electrophoretic particles to a dispersing medium; a method of carrying out dispersing treatment after or during the addition of a dispersing medium to electrophoretic particles; a method of carrying out dispersing treatment after or during the mixing of electrophoretic particles and a dispersing medium; and a method of further carrying out dispersing treatment after or during the addition of a remaining dispersing medium to a dispersion in which electrophoretic particles have been dispersed in a part of the dispersing medium. The dispersing treatment may be carried out using any of the previously known means, which is not particularly limited. For example, there can be used an ultrasound homogenizer, a paint shaker, a ball mill, a sand grinding mill, and a V blender.

When electrophoretic particles are treated with a coupling agent at the same time that dispersing treatment is carried out, for example, there can be used a dry method of spraying a coupling agent with dry air or nitrogen gas while forcibly stirring a dispersing medium and electrophoretic particles with a V blender; a wet method of adding a coupling agent in a state where electrophoretic particles are appropriately dispersed in a dispersing medium to form a slurry; and a spray method of spraying a coupling agent while vigorously stirring a pre-warmed dispersing medium and electrophoretic particles.

<<Microcapsule for Electrophoretic Display>>

The dispersion for electrophoretic display can be used for a microcapsule for electrophoretic display by encapsulating it into a capsule shell. The microcapsule for electrophoretic display (hereinafter referred to as the "microcapsule" in some cases) is formed by the encapsulation of a dispersion for electrophoretic display in a capsule shell. The microcapsule, when used in a one-particle-type electrophoretic device, includes a dispersion for electrophoretic display containing electrophoretic particles having either a positive zeta potential or a negative zeta potential exhibited by their dispersion when dispersed in a dispersing medium and, when used in a two-particle-type electrophoretic display device, includes a dispersion for electrophoretic display containing a combination of electrophoretic particles having a positive zeta potential exhibited by their dispersion when dispersed in a dispersing medium and electrophoretic particles having a negative a zeta potential exhibited by their dispersion when dispersed in a dispersing medium. The dispersion for electrophoretic display may preferably keep a dispersion state at the time of production even after encapsulated in a capsule shell, and it is not necessary that the dispersion retains entirely the same dispersion state as the dispersion state at the time of production.

The shape of microcapsules, although it is not particularly limited, may preferably be a particulate shape such as a spherical shape. When microcapsules are particulate, their average particle diameter, although it is not particularly limited, may preferably have a lower limit of 10 μm, more preferably 15 μm, still more preferably 20 μm, and an upper limit of 300 μm, more preferably 250 μm, still more preferably 200 μm, as expressed in volume average particle diameter. When the average particle diameter of microcapsules is lower than 10 µm, a sufficient display concentration cannot be obtained in a display part when the microcapsules are used in an electrophoretic display device, so that display properties may be deteriorated. In contrast, when the average particle diameter of microcapsules is higher than 300 µm, the mechanical strength of the microcapsules may become insufficient, so that the cracking of the microcapsules may be increased and, when the microcapsules are used in an electrophoretic display device, electrophoretic particles in a dispersion encapsulated in the microcapsules cannot exhibit sufficient electrophoretic properties, so that a driving voltage for displaying may be raised.

The particle size distribution of microcapsules, although it is not particularly limited, may preferably be a particle size distribution such that 80% or higher by volume, more preferably 85% or higher by volume of the microcapsules are present in the particle diameter range of a particle diameter length corresponding to 40% of the maximum peak particle diameter, around the above maximum peak particle diameter (the particle diameter corresponding to the maximum peak in a particle diameter frequency distribution using the volume of microcapsules as a standard). If the particle size distribution is such a particle size distribution that lower than 80% by volume of microcapsules are present in the particle diameter range, when a coating solution with the microcapsules dispersed therein is prepared and this coating solution is coated on a substrate sheet, the microcapsules cannot be coated in one layer, and may partially be coated in a multilayer such as two or more layers.

<Capsule Shell>

A capsule shell forming a microcapsule can be formed using the same material as that of a capsule shell in the previously known microcapsule. For example, when microcapsules are produced by a coacervation method, preferred are combinations of compounds each having an isoelectric point, such as gelatin, or cationic compounds such as polyethyleneimine, and anionic compounds such as gum arabic, sodium alginate, styrene-maleic anhydride copolymers, vinyl methyl ether-maleic anhydride copolymers, phthalic acid esters of starch, and polyacrylic acids. When microcapsules are produced by an in-situ polymerization method, preferred are melanine-formaline resins (melamine-formaline prepolymers), and radical polymerizable monomers. When microcapsules are produced by an interface polymerization method, preferred are combinations of hydrophilic monomers such as polyamines, glycols and polyhydric phenols, and hydrophobic monomers such as polybasic acid halides and polyvalent isocyanates, in which case formed are capsule shells comprising polyamides, epoxy resins, polyurethanes or polyureas.

When a polyvalent amine is used as a crosslinking agent in the production of capsule shells, there can be obtained microcapsules with capsule shells having excellent heat resistant storage stability. The amount of a polyvalent amine to be used is not particularly limited, so far as the desired physical properties necessary for capsule shells cannot extremely be deteriorated. Examples of the polyvalent amine may include aliphatic amines such as ethylenediamine, diethylenetriamine, triethylenetetramine, tetraethylenepentamine, 1,3-propylenediamine, and hexamethylenediamine; epoxy compound adducts of aliphatic polyvalent amines, such as poly(mono- to penta-)alkylene ($C_2$ to $C_6$) polyamine-alkylene ($C_2$ to $C_{18}$) oxide adducts; aromatic polyvalent amines such as phenylenediamine, diaminonaphthalene, and xylylenediamine; alicyclic polyvalent amines such as piperazine; and heterocyclic diamines such as 3,9-bis-aminopropyl 2,4,8,10-tetraoxaspiro-[5.5]undecane. These polyvalent amines may be used alone, or two or more kinds of them may be used in combination.

The thickness of capsule shells forming microcapsules, although it is not particularly limited, may preferably have a lower limit of 0.1 µm and an upper limit of 5 µm, more preferably 4 µm, still more preferably 3 µm. When the thickness of capsule shells is smaller than 0.1 µm, the mechanical strength of microcapsules may become insufficient, so that the cracking of the microcapsules may be increased. In contrast, when the thickness of capsule shells is greater than 5 µm, the transparency of microcapsules may be reduced, so that contrast may be reduced, and the flexibility of the microcapsules may be reduced, so that adhesiveness to a substrate sheet may become insufficient.

<<Production of Microcapsules for Electrophoretic Display>>

The microcapsules for electrophoretic display can be obtained by any of the previously known processes for producing microcapsules, except that there is used a dispersion for electrophoretic display containing electrophoretic particles in a dispersing medium.

Examples of the process for producing microcapsules may include the "interface settlement" methods such as a coacervation method (phase separation method), an in-liquid drying method, a melt degradation cooling method, a spray drying method, a pan coating method, an in-air suspending coating method, and a powder bed method, and the "interface reaction" methods such as an interface polymerization method, an in-situ polymerization method, an in-liquid cured film (coating) method (orifice method), and an interface reaction method (inorganic chemical reaction method). In these processes, preferred are a coacervation method, an in-situ polymerization method, an interface polymerization method, an in-liquid drying method, a melt degradation cooling method. In the microcapsulation step of these processes, as a core material encapsulated in capsule shells, there is used a dispersion for electrophoretic display containing electrophoretic particles in a dispersing medium. When such a method is used, microcapsules in which the dispersion is encapsulated in capsule shells can be obtained extremely easily.

In carrying out the microcapsulation step, usually, it is necessary to bring a liquid material (in this case, a dispersion for electrophoretic display) into a state as a core material (e.g., the form of a liquid droplet), a method for doing so is not particularly limited, but a liquid droplet may be formed by spraying or dropwise addition in a vapor phase or by using an orifice, or a liquid droplet may be formed by dispersing a material in an aqueous medium or a non-aqueous medium.

Examples of the aqueous medium may include water, mixtures of water and hydrophilic solvents (e.g., alcohols, ketones, esters, glycols), solutions in which water-soluble polymers (e.g., PVA (polyvinyl alcohol), CMC (carboxymethylcellulose), gelatin, gum arabic) are dissolved in water, solutions in which surfactants (e.g., anionic surfactants, cationic surfactants, nonionic surfactants) are added to water, and solutions in which these aqueous mediums are mixed. Examples of the non-aqueous medium may include organic solvents which are not substantially compatible with a dispersing medium used in a dispersion for electrophoretic display. In these mediums, preferred are aqueous mediums.

The amount of a dispersion for electrophoretic display to be dispersed, although it is not particularly limit, may preferably have a lower limit of 20 parts by weight, more preferably 30 parts by weight, and an upper limit of 200 parts by weight, more preferably 150 parts by weight, based on 100 parts by weight of an aqueous medium or a non-aqueous medium. When the amount of a dispersion for electrophoretic display to be used is lower than 20 parts by weight, microcapsules having a wide particle size distribution may be obtained, leading to a lowering in productivity. In contrast, when the amount of a dispersion for electrophoretic display to be used is higher 200 parts by weight, a reverse suspension may be formed, so that microcapsules cannot be produced.

The amount of a capsule shell raw material to be used, although it is not particularly limited, may preferably have a lower limit of 100 parts by weight, more preferably 500 parts by weight, and an upper limit of 5,000 parts by weight, more preferably 3,000 parts by weight, based on 100 parts by weight of a dispersion for electrophoretic display. When the amount of a capsule shell raw material to be used is lower than 100 parts by weight, or higher than 5,000 parts by weight, capsule shells having a desired thickness cannot be obtained.

In carrying out the microcapsulation step, other components may appropriately be used, in addition to a dispersion for electrophoretic display and a capsule shell raw material and, if necessary, an aqueous medium or a non-aqueous medium.

Usually, after microcapsules are produced by the microcapsulation step, the microcapsules are isolated by filtration, if necessary. For example, when the microcapsulation step is carried out by dispersing a dispersion for electrophoretic display in an aqueous medium, microcapsules may preferably be wet classified so that a desired average particle diameter and particle size distribution can be obtained, after the production of the microcapsules, and the microcapsules are separated from the aqueous medium by suction filtration or natural filtration. In addition, in order to remove impurities to improve the quality of a product, the resulting microcapsules may preferably be washed.

In the wet classification of microcapsules, a preparation solution obtained in the microcapsulation step, that is, a preparation solution containing the microcapsules in an aqueous medium is subjected to classification treatment, as it is, or after it is diluted with an appropriate aqueous medium, so that the microcapsules contained in the preparation solution have a desired average particle diameter and particle size distribution. The classification treatment can be carried out by a method or an apparatus using a system such as a sieving system (filter system), centrifugation system, or natural settlement system. In the case of microcapsules having a relatively large average particle diameter, a sieving system is effective.

<<Sheet for Electrophoretic Display>>

The microcapsules for electrophoretic display are used in a sheet for electrophoretic display by being supported on a substrate sheet. The sheet for electrophoretic display according to the present invention is a sheet for electrophoretic display in which a layer containing microcapsules for electrophoretic display (hereinafter referred to as the "microcapsule layer" in some cases) is formed on an electrically conductive layer of a substrate sheet with the electrically conductive layer formed on a substrate film, the sheet comprising microcapsule supporting parts on which the microcapsules are supported and electrically conductive layer exposing parts on which the electrically conductive layer is exposed, both parts being alternately arranged in the width direction of the sheet. When the sheet for electrophoretic display is used in an electrophoretic display device, the electrically conductive layer serves as one of the electrodes.

The microcapsules can be supported substantially in a monolayer and substantially densely on a substrate sheet. As used herein, the term "substantially in a monolayer" means that one microcapsule is supported and two or more microcapsules are not overlaid in the thickness direction of a substrate sheet. For example, so far as the desired function is not damaged, parts of adjacent microcapsules may slightly be overlaid. On the other hand, the term "substantially densely" means that microcapsules are supported in the closest packed state without a gap in the surface direction of a substrate sheet. In this case, it is not problematic that some local space is formed between the adjacent microcapsules depending on the planar shape of the microcapsules. In addition, so far as the desired function is not damaged, the strict closest packed state is not necessary to be achieved.

The thickness of a microcapsule layer, although it is not particularly limited because it may vary depending on the average particle diameter of microcapsules, may preferably have a lower limit of 10 µm, more preferably 16 µm, still more preferably 20 µm, and an upper limit of 300 µm, more preferably 250 µm, still more preferably 200 µm. If the thickness of a microcapsule layer is smaller than 10 µm, when the sheet for electrophoretic display is used in an electrophoretic display, a sufficient display concentration cannot be obtained at a display part, and the display part cannot clearly be distinguished from the other non-display part. In contrast, if the thickness of a microcapsule layer is greater than 300 µm, when the sheet for electrophoretic display is used in an electrophoretic display device, electrophoretic particles in a dispersion encapsulated in the microcapsules cannot exhibit sufficient electrophoretic properties, so that display properties such as contrast may be deteriorated and a driving voltage for displaying may be raised.

In the microcapsule layer, the microcapsules may have the same shapes as those in a coating solution, or may be deformed by the drying step after coating. The microcapsules may be spherical or may have shapes slightly deformed from a spherical shape. At a contact part between the adjacent microcapsules, or at a contact part between the microcapsules and the substrate sheet, the microcapsules may be pressed and deformed, and may come in contact, in planes, with the substrate sheet. The microcapsules may uniformly be arranged in a complete monolayer, or so far as the desired function cannot be damaged, the microcapsules may partially be overlaid or may form two or more layers. In addition, depending on their use or purpose, the microcapsules may be supported in a monolayer or a multilayer, or may be supported discretely or densely, by the appropriate selection of a coating apparatus and coating conditions.

To a sheet for electrophoretic display, there may be attached another sheet material such as a release film, an electrode sheet, a surface protection sheet, and a coloring sheet, or another coating material may be coated on the surface of the sheet for electrophoretic display. In addition, a sheet for electrophoretic display may be used by attachment to another material such as a sheet- or plate-shaped material. Further, a sheet for an electrophoretic display may be used by processing into a desired size and shape.

<Substrate Sheet>

The substrate sheet has an electrically conductive layer formed on a substrate film, and serves to support microcapsules on the electrically conductive layer. The substrate sheet may preferably have transparency and electrical conductivity and, for example, there may be used a transparent electrically conductive film in which an electrically conductive layer is formed on the surface of a transparent plastic film. The substrate sheet may preferably have, for example, a transmittance of 80% or higher, and a surface electric resistance of 1,000 Ω or lower. When the transmittance of a substrate sheet is lower than 80%, contrast may be reduced, so that display may become unclear. When the surface electric resistance of a substrate sheet is higher than 1,000 Ω, the rapid migration of electrophoretic particles may become difficult at a part to which a voltage is applied for displaying, so that their speed of response (display responsiveness) may be reduced.

However, in the production of an electrophoretic display device, if another substrate sheet to be attached to a sheet for electrophoretic display is transparent, a substrate sheet used in the sheet for electrophoretic display need not necessarily to be transparent.

Examples of the material for a substrate film forming a substrate sheet may include acrylic resins, polyester resins, polyolefin resins, polycarbonate resins, and polyimide resins. In these resins, preferred are polyester resins, and particularly preferred is polyethylene terephthalate (PET).

Examples of the material for an electrically conductive layer to be formed on a substrate film may include inorganic electrically conductive materials such as indium tin oxide (ITO), zinc oxide, metal fine particles, and metal foils, and organic electrically conductive materials such as polyacetylene, polyaniline, polypyrrole, polyethylenedioxythiophene, and polythiophene.

Examples of the method of forming an electrically conductive layer on a substrate film may include dry coating methods such as vacuum deposition and sputtering, and wet coating methods of coating a dispersion or a solution of an electrically conductive material.

The thickness of a substrate sheet, although it is not particularly limited, may preferably be 20 to 200 μm. When the thickness of a substrate sheet is smaller than 20 μm, creases may easily occur. In contrast, when the thickness of a substrate sheet is higher than 200 μm, the winding diameter of a wound roll of the sheet for electrophoretic display may become great, so that handling may become difficult, and the amount of a waste after use may be increased.

<Adhesive Layer>

The substrate sheet may have an adhesive layer formed on the surface of an electrically conductive layer on which side a microcapsule layer is formed. When an adhesive layer is formed on a substrate sheet, microcapsules can effectively be supported on the substrate sheet. In addition, the microcapsules can be supported substantially in a monolayer and substantially densely, so that the microcapsules supported on the substrate sheet cannot easily be detached.

The material of an adhesive layer may appropriately be selected depending on the material of capsule shells forming microcapsules, although it is not particularly limited, and for example, there can be used water-soluble or water-dispersible or emulsifiable resins such as polyester resins, acrylic resins, epoxy resins, urethane resins, oxazoline resins, PVP resins, polyoxyalkylene resins, and cellulose resins. The formation of an adhesive layer can be carried out by any of the previously known coating techniques.

<<Process for Producing Sheet for Electrophoretic Display>>

The process for producing a sheet for electrophoretic display according to the present invention comprises coating a coating solution containing microcapsules for electrophoretic display on a substrate sheet and drying it to form a layer containing the microcapsules on the substrate sheet. More particularly, the process for producing a sheet for electrophoretic display according to the present invention comprises the steps of (a) continuously running a strip-shaped substrate sheet in which an electrically conductive layer is formed on a substrate film, and coating, on the substrate sheet, a coating solution containing microcapsules for electrophoretic display, using a coating apparatus of the kiss reverse coating system having a coating roll in which a granule pattern is discontinuously formed in an axial direction of an external circumferential surface; and (b) after the step (a), drying the coating solution to form a layer containing the microcapsules on the electrically conductive layer to obtain a sheet for electrophoretic display in which microcapsule supporting parts on which the microcapsules are supported and electrically conductive layer exposing parts on which the electrically conductive layer is exposed are alternately arranged in the width direction of the sheet.

<Coating Solution>

As a dispersing medium in which microcapsules are dispersed, preferred are aqueous mediums, examples of which may include those aqueous mediums listed above as an aqueous medium used in the production of microcapsules.

The shape and average particle diameter of microcapsules are as described above and, in the step (a) it is preferred to coat, on a substrate sheet, a coating solution containing microcapsules having an average particle diameter of 20 to 200 μm.

The amount of microcapsules to be contained in a coating solution, although it is not particularly limited, may preferably have a lower limit of 25% by weight, more preferably 30% by weight, still more preferably 35% by weight, and an upper limit of 70% by weight, more preferably 60% by weight, still more preferably 50% by mass. When the amount of microcapsules to be contained is lower than 25% by weight, gaps without microcapsules may be produced in a coated film, so that it may become a cause for display defects when the sheet for electrophoretic display is used in an electrophoretic display device. In contrast, when the amount of microcapsules to be contained is higher than 70% by weight, microcapsules may easily be aggregated and the flowability of a coating solution may be reduced, so that coating may become difficult.

The viscosity of a coating solution, although it is not particularly limited, may preferably be 53 to 100 KU as expressed by a value measured with a Klebs viscometer. When the viscosity of a coating solution is too low, microcapsules may be separated, or the coating solution may have high flowability, so that it may become difficult to coat the coating solution in a desired thickness. In contrast, when the viscosity of a coating solution is too high, the coating solution may have low flowability, so that it may become difficult to coat a coating solution in a desired thickness.

The coating solution may contain, in addition to microcapsules, if necessary, various additives such as dispersants, viscosity modifiers, preservatives, and anti-foaming agents. When the bonding force between the microcapsules and the substrate sheet is deficient, binders can be used. When additives or binders are added to a coating solution, the amounts of the additives or binders to be used are not particularly limited, so far as coating on a substrate sheet cannot be inhibited and the effect of using the additives or binders can be obtained.

<Binder>

As a binder to be added to a coating solution, for example, preferred are organic binders. Examples of the organic binder may include synthetic resin binders such as acrylic resins, polyester resins, fluorine resins, alkyd resins, amino resins, vinyl resins, epoxy resins, polyamide resins, polyurethane resins, unsaturated polyester resins, phenol resins, polyolefin resins, silicone resins, acryl-silicone resins, xylene resins, ketone resins, rosin-modified maleic acid resins, liquid polybutadiene resins, and coumarone resins; natural or synthetic rubber binders such as ethylene-propylene copolymer rubbers, polybutadiene rubbers, styrene-butadiene rubbers, and acrylonitrile-butadiene copolymer rubbers; natural resin binders such as shellac, rosin (pine resin), ester gum, cured rosin, decolored shellac, and white shellac; thermoplastic or thermosetting polymer binders such as cellulose nitrate, cellulose acetate butylate, cellulose acetate, ethylcellulose, hydroxypropylmethylcellulose, and hydroxyethylcellulose. The synthetic resin binders may be plastic (thermoplastic) binders, or curable (including thermosetting, ultraviolet ray curable, electron beam curable, moisture curable, and their combined use) binders such as acrylic resins, methacrylic resins, and epoxy resins. These organic binders may be used alone, or two or more kinds of them may be used in combination.

The form of a binder may be of the solvent-soluble type, water-soluble type, emulsion type, and dispersion type (in any solvents such as water/organic solvents).

Examples of the water-soluble binder may include water-soluble alkyd resins, water-soluble acrylic-modified alkyl resins, water-soluble oil free alkyd resins (water-soluble polyester resins), water-soluble acrylic resins, water-soluble epoxyester resins, and water-soluble melamine resins.

Examples of the emulsion-type binder may include (meth) acrylic acid alkyl copolymer dispersions, vinyl acetate resin emulsions, vinyl acetate copolymer resin emulsions, ethylene-vinyl acetate copolymer resin emulsions, acrylic acid ester (co)polymer resin emulsions, styrene-acrylic acid ester (co)polymer resin emulsions, epoxy resin emulsions, urethane resin emulsions, acrylic-silicone emulsions, and fluorine resin emulsions.

<Dispersant>

Examples of the dispersant to be added to a coating solution may include polyacrylic acid salts; styrene-maleic acid copolymer salts; formalin condensates of naphthalenesulfonic acid salts; long chain alkyl organic sulfonic acid salts; polyphosphoric acid salts; long chain alkylamine salts; polyalkylene oxides; polyoxyalkylene alkyl ethers; sorbitan fatty acid esters; fluorine surfactants such as perfluoroalkyl group-containing salts, perfluoroalkyl group-containing esters, and perfluoroalkyl group-containing oligomers; nonionic surfactants such as acetylenediols and acetylene glycols. These dispersants may be used alone, or two or more kinds of them may be used in combination.

Examples of the viscosity modifier to be added to a coating solution may include cellulose viscosity modifiers such as carboxymethylcellulose, methylcellulose, and hydroxyethylcellulose; polycarboxylic acid viscosity modifiers such as sodium polyacrylates, alkali-soluble emulsions, and association-type alkali-soluble emulsions; polyethylene glycol viscosity modifiers such as polyethylene glycol, polyethylene glycol alkyl ether, polyethylene glycol alkyl ester, and association-type polyethylene glycol derivatives; other water-soluble polymer viscosity modifiers such as polyvinyl alcohol; and smectite viscosity modifiers such as montmorillonite, hectorite, and saponite. These viscosity modifiers may be used alone, or two or more kinds of them may be used in combination.

<Preservative>

Examples of the preservative to be added to a coating solution may include organic nitrogen sulfur compounds, organic nitrogen halogen compounds, chlorohexidine salts, cresol compounds, bromo compounds, aldehyde compounds, benzimidazole compounds, halogenated cyclic sulfur compounds, organic arsenic compounds, organic copper compounds, isothiazolone chloride, and isothiazolone. These preservatives may be used alone, or two or more kinds of them may be used in combination.

<Anti-forming Agent>

Examples of the anti-foaming agent to be added to a coating solution may include silicone anti-forming agents, Pluronic-type anti-foaming agents, mineral oil anti-foaming agents, polyester anti-foaming agents, and polyether anti-foaming agents. These anti-foaming agents may be used alone, or two or more kinds of them may be used in combination.

<Coating Apparatus>

As a device for coating, on a substrate sheet, a coating solution in which microcapsules are dispersed, there can be used any of the coating apparatuses which are used in the technique of ordinary coating microcapsules. Preferred are coating apparatuses employing the kiss coating system as the fundamental coating system.

In the kiss coating system, a coating roll with a coating solution attached thereto comes in contact with a continuously running substrate sheet while the roll is rotated, to transfer the coating solution from the coating roll onto the substrate sheet, whereby the coating solution is coated on the substrate sheet. In this case, at a position where the substrate sheet is brought into contact with the coating roll, the surface of the substrate sheet, opposite to the contact surface of the coating roll, is opened, and there are neither pressure rolls nor backup rolls in an ordinary roll coater or gravure coater.

The substrate sheet is brought into contact with the coating roll at such an extent of a pressure that the sheet is slightly pressed against the coating roll. Specifically, guiding rolls are arranged upstream and downstream, relative to the substrate sheet, from the position of contact with the coating roll. The substrate sheet running straight along the tangential line direction between the guiding rolls is deformed to be slightly bent by the coating roll. A pressure caused by the bending deformation of the substrate sheet acts between the substrate sheet and the coating roll.

In a coating apparatus of the kiss coating system, the running direction of a substrate sheet and the rotating direction of a coating roll may be set to be the same direction, or may be set to be reverse. Alternatively, they may be set to have a difference of speed in the same direction.

A coating technique in which the rotating direction of a coating roll is set in a direction reverse to the running direction of a substrate sheet is called the reverse coating system. In the reverse coating system, a coating solution attached to the coating roll is transferred onto the substrate sheet at a point of contact with the substrate sheet. At this point of contact, the substrate sheet and the coating roll slightly come in contact with each other, so that an excessive pressure cannot be applied to microcapsules. In addition, at the point of contact, a coating solution is pulled from both of the substrate sheet and the coating roll, whereby, an appropriate shearing stress is applied, so that the coating solution can uniformly be transferred onto the substrate sheet.

When the rotation direction of a coating roll is the same as the running direction of a substrate sheet, it is not the reverse coating system; however, so far as it is the kiss coating system, the substrate sheet and the coating roll only slightly come in contact with each other at the above point of contact between the coating roll and the substrate sheet, so that an excessive pressure cannot be applied to microcapsules.

When an appropriate difference is set between the circumferential speed of a coating roll and the running speed of a substrate sheet, a coating solution is stretched on the substrate sheet by its difference of speed, so that a thin and uniform coating film can easily be formed.

A coating speed, that is, the running speed of a substrate sheet, although it is not particularly limited, may appropriately be set depending on drying conditions or the like after coating. For example, the running rate may preferably be set at 0.1 to 10 m/min. When the running speed is lower than 0.1 m/min, productivity may be decreased. In contrast, when the running rate is higher than 10 m/min, the drying of a coating solution may become poor, so that blocking may easily be caused.

The thickness of a coating solution coated on a substrate sheet, although it is not particularly limited, may appropriately be set depending on the average particle diameter of microcapsules contained in a coating solution. For example, the thickness of a coating solution may preferably be set to be 10 to 300 μm in a wet state, and may preferably be set to be 10 to 200 μm in thickness after drying, more preferably 10 to 100 μm in thickness after drying. Therefore, in the step (b), it the thickness of a layer containing microcapsules may preferably be 10 to 100 μm in thickness after drying.

In a coating apparatus of the kiss coating system, a coating roll can be arranged so that it can approach a substrate sheet, or it can be moved away from the substrate sheet during coating work. The adjustment of an interval between the coating roll and the substrate sheet in this manner makes possible the precise adjustment of a coating thickness. When the coating roll is completely moved away from the substrate sheet, a coating solution can discontinuously be coated in the length direction of the substrate sheet. Thus, there can be produced a sheet for electrophoretic display in which microcapsule supporting parts are discontinuously arranged in the length direction.

<Microgravure Coater>

The microgravure coater is of the kiss system, and is known as a coating apparatus of the reverse system. Specifically, the microgravure coater is based on a coating technique disclosed in Japanese Patent Publication No. 5-53553.

The coating roll has a gravure pattern on an external circumferential surface. The gravure pattern is a pattern-shaped design consisting of fine irregularities, and a coating solution attached to the gravure pattern is transferred in a state where the coating solution is surely supported by the irregularities of the gravure pattern, and is then coated on a substrate sheet. The microcapsules in the coating solution may easily be scooped up or transferred by the irregularities of the gravure pattern. In addition, only a liquid component in the coating solution can be prevented from attaching to the surface of a coating roll.

Regarding the size and the shape of a gravure pattern, conditions suitable for the supporting of microcapsules can be selected from those which have been employed in a microgravure coater utilized for the coating of an ordinary paint or ink. For example, the depth and the pitch interval of a gravure pattern can be set depending on the average particle diameter of microcapsules dispersed in a coating solution. As the pattern shape, slant lines which are inclined relative to the axial direction of a coating roll can be arranged spirally on the circumferential surface of the coating roll. Alternatively, a lattice-like gravure pattern can be formed by slant lines which are mutually crossed. Besides, there can be employed any gravure patterns which have been employed for an ordinary microgravure roll.

For coating a coating solution containing microcapsules having a relatively large average particle diameter, the groove of a gravure pattern may effectively be set deep and great.

The cell volume of a gravure pattern, although it is not particularly limited, may preferably be set to be 50 to 200 mL/m². When the cell volume is too small, it may become difficult to support microcapsules having a great average particle diameter. In contrast, when the cell volume is too great, the irregularities of a gravure pattern may be transferred onto a coated film, and it may become difficult to uniformly arrange microcapsules.

The external diameter of a coating roll is set to be remarkably smaller than the external diameter of a coating roll in an ordinary gravure coater. The external diameter, although it may vary depending on the composition of a coating solution and the coating conditions, may preferably be 20 to 60 mm in diameter.

The rotation of a coating roll is in the direction reverse to the running direction of a substrate sheet, and the rotation number of a coating roll may vary depending on other condition, e.g., the running speed of a substrate sheet. When there is appropriately set the rotation number of a coating roll relative to the running speed of a substrate sheet, that is, the circumferential speed, microcapsules can uniformly be supported on the substrate sheet. The ratio of the circumferential speed of a coating roll relative to the running speed of a substrate sheet, that is, the ratio of speed may preferably be set to be two to twenty. When the ratio of speed is too small, the amount of a coating solution to be coated may be deficient, or the uniformity of microcapsules supported on the substrate sheet may be reduced. When the ratio of speed is too great, the rotation of a coating roll may become too fast, so that the efficiency of transferring a coating solution from a coating roll onto a substrate sheet may be reduced, whereby the amount of the coating solution to be coated may be deficient, or the coating solution may be overflown from the reservoir thereof.

In the microgravure coater, a doctor blade mechanism may be provided on a front side before a coating roll comes in contact with a substrate sheet. The doctor blade mechanism is effective for adjusting the amount of a coating solution to be attached to the coating roll, to supply the appropriate amount of a coating solution to a substrate sheet.

<Drying of Coated Film>

The coating solution coated on a substrate sheet is dried, so that microcapsules are supported on a substrate sheet. When a binder is added to a coating solution, the binder is cured to have the function of bonding the microcapsules to the substrate sheet.

As the drying method, there may be any of the previously known drying techniques, which is not particularly limited. Examples thereof may include natural drying and forced drying. As the forced drying means, there can be used any of the previously known drying means such as hot air and far infrared-ray. The drying conditions, although it is not particularly limited, may appropriately be set depending on the viscosity of a coating solution and the area of a coated film. For example, the drying temperature may preferably have a lower limit of 15° C., more preferably 20° C., and an upper limit of 150° C., more preferably 120° C. The drying time may preferably have a lower limit of 1 minute, more preferably 5 minutes, and an upper limit of 60 minutes, more preferably 45 minutes.

When a binder is added to a coating solution, the method of curing the coating solution, although it is not particularly limited, may appropriately be selected depending on the components of a binder contained in a coating solution. Examples thereof may include curing methods by the evaporation of a dispersing medium, curing methods by heating, and curing methods by the irradiation of ultraviolet-ray or any other radiations.

<Attachment of Release Film>

The attachment of a release film to the surface on which side a microcapsule layer is formed makes the sheet for electrophoretic display according to the present invention into a sheet for electrophoretic display in which a substrate sheet, a microcapsule layer, and a release film are laid in this order.

The release film is a member which, when attached to the surface of a sheet for electrophoretic display, exhibits relatively weak adherability, and is incorporated into the sheet for electrophoretic display, but when a force is applied, can relatively easily be removed.

If a release film is attached, when a sheet for electrophoretic display is overlaid, supported microcapsules are attached to the back of an adjacent sheet for electrophoretic display, so that blocking can be prevented. The release film also has the function of covering the surfaces of microcapsules to protect the microcapsules. In addition, it becomes easy to wind a sheet for electrophoretic display, and convey or handle the sheet for electrophoretic display in a wound roll.

The release film, although it is not particularly limited, may preferably be polyolefin films having excellent removability. Specific examples thereof may include gently pressure-sensitive adhesive polyethylene films, and polypropylene films such as biaxially stretched polypropylene films and unstretched polypropylene films. As the gently pressure-sensitive adhesive polyethylene film, there can be used monolayer-structure films in which a pressure-sensitive adhesive substance is kneaded, or laminated structure films on which a gently pressure-sensitive adhesive substance is coated.

The thickness of a release film, although it is not particularly limited, may preferably a lower limit of 40 µm, more preferably 50 µm, and an upper limit of 120 µm, more preferably 100 µm. When the release film is too thin, creases may easily occur. When the release film is too thick, the sheet for electrophoretic display may become to have a great winding diameter when wound in a roll, its handling may become difficult, and the amount of a waste after use may be increased.

In order to attach a release film to a sheet for an electrophoretic display, they can be attached to each other by simply overlaying and winding the sheet for electrophoretic display and the release film. The pressing or heating of the sheet for electrophoretic display and the release film before winding, integrity can be enhanced between the sheet for electrophoretic display and the release film. For this reason, preferably, the process for producing a sheet for electrophoretic display according to the present invention may further comprises, after the step (b), the step of attaching a release film to a layer containing microcapsules, and winding the resulting sheet, as the step (c).

The release film can strongly be attached when a pressure is added in the attachment of the release film; therefore, it is effective, but when a pressure to be added is too high, the deformation or damage of microcapsules may occur, and it may becomes difficult to remove the release film. For this reason, a pressure which may be added in the attachment of a release film may preferably be 9.8 N/m$^2$ (1 kgf/cm$^2$) to 196 N/cm$^2$ (20 kgf/cm$^2$).

<Wound Roll>

The sheet for electrophoretic display with a release film attached thereto can be wound on a roll, and can undergo handling, such as storage and transport, in the form of a wound roll.

The winding can be carried out using the same apparatus and working conditions as those employed for the winding of an ordinary sheet material. The wound sheet can be brought into a state where a winding pressure is added at some level between the sheet for electrophoretic display and the release film. This winding pressure may be set to be a pressure at the same level as that of a pressure which may be added in the attachment of a release film. A wound roll retained in a state where a winding pressure is added, provide the effect of smoothing the surface of a microcapsule layer. At the time of using a sheet for electrophoretic display, when another member is attached to the microcapsule layer of the sheet, there can be obtained the effect of increasing a contact area therebetween.

<<Electrophoretic Display Device>>

The sheet for electrophoretic display according to the present invention can be used in an electrophoretic display device, for example, as a constitutional element of a data display part. The electrophoretic display device of the present invention is an electrophoretic display device comprising a data display part, wherein the data display part comprises the sheet for electrophoretic display of the invention. The electrophoretic display device of the present invention is the same as any of the previously known electrophoretic display devices, except that the data display part comprises the sheet for electrophoretic display of the present invention. For this reason, parts other than the data display part, such as a driver circuit and a power supply circuit, may be formed as in any of the previously known electrophoretic display devices. That is, the electrophoretic display device of the present invention can be obtained by forming the data display part of any of the previously known electrophoretic display devices with the sheet for electrophoretic display of the present invention. In the present invention, a driver circuit and a power supply circuit may be incorporated in the external circuit, in which case only the data display part may be referred to as the electrophoretic display device.

The electrophoretic display device of the present invention, when there are used electrophoretic particles having either a positive zeta potential or a negative zeta potential exhibited by their dispersion when dispersed in a dispersing medium, is a one-particle-type electrophoretic display device and, when there is used a combination of electrophoretic particles having a positive zeta potential exhibited by their dispersion when dispersed in a dispersing medium and electrophoretic particles having a negative zeta potential exhibited by their dispersion when dispersed in a dispersing medium, is a two-particle-type electrophoretic display device.

In the production of an electrophoretic display device of the present invention, for example, when a sheet for electrophoretic display is in the form of a wound roll, the sheet is unwound, cut into a prescribed size, as such, or when a release film has been attached, the release film is removed, and another substrate sheet in which an electrically conductive layer is formed on a substrate film may be attached, for example, by a laminating technique. In this case, the electrically conductive layer of another substrate sheet may be made opposite to the microcapsule layer, so that the electrically conductive layer of another substrate sheet serves as the other electrode in an electrophoretic display device. In addition, when a driver layer consisting of film transistors using amorphous silicone or polysilicone, or organic transistors using organic molecules is provided on another substrate sheet, display can be controlled. Alternatively, the renewing of data may be carried out by an external device without formation of a driving layer. The display controlling means, although it is not particularly limited, may appropriately be selected depending on the use of an electrophoretic display device.

When another substrate sheet is laminated on a sheet for electrophoretic display, the procedure and conditions of laminating can appropriately be selected and used from the previously known techniques. In this case, in order to obtain an electrophoretic display device which can stably exhibit extremely excellent display properties, in general, the microcapsule layer may preferably be allowed to sufficiently adhere to the substrate sheet (increase their contact area). When the adhesiveness to the substrate sheet is low, display properties such as display responsiveness and contrast may be deteriorated. In order to enhance adhesiveness, for example, the elevation of a temperature and a pressure at the time of laminating can be considered. On the other hand, regarding microcapsules, the adhesiveness to the substrate sheet can further be enhanced by appropriately adjusting the amount of a capsule shell raw material to be used for the enhancement of their flexibility and adhesion properties. The use of this method makes it possible to obtain sufficient adhesiveness, even when conditions such as a temperature and a pressure at the time of laminating are made mild at some level.

An electrophoretic display device can be obtained by forming a data display part with the laminated sheet for electrophoretic display, and incorporating other constituent parts such as a driver circuit and a power supply circuit. Alternatively, a driver circuit and a power supply circuit may be incorporated in the external circuit, and only the data display part formed with the laminated sheet for electrophoretic display may be used as an electrophoretic display device.

In the electrophoretic display device of the present invention, an interval of the electrically conductive layers of the substrate sheets, that is, an interval between the opposite electrodes, although it is not particularly limited, may preferably have a lower limit of 10 μm, more preferably 15 μm, still more preferably 20 μm, and an upper limit of 120 μm, more preferably 80 μm, still more preferably 60 μm. When an interval between the opposite electrodes is smaller than 10 μm, a sufficient display concentration cannot be obtained at a display part, and the display part cannot clearly be distinguished from the other non-display part. In contrast, when an interval between the opposite electrodes is greater than 120 μm, electrophoretic particles in a dispersion encapsulated in the microcapsule cannot exhibit sufficient electrophoretic properties, so that display properties such as contrast may be deteriorated and a driving voltage for displaying may be raised.

In the electrophoretic display device of the present invention, for example, when pigment particles forming electrophoretic particles are white pigment particles, and a dispersing medium is colored with a blue dye, the initial display is pale blue, but when a voltage is applied between the opposite electrodes, the electrophoretic particles migrate toward the direction of one electrode, resulting in white display or blue display. When the polarity of a voltage is reversed, the electrophoretic particles migrate toward the direction of the other electrode, so that the white display or blue display is reversed to blue display or white display. When the polarity of a voltage is reversed again and the voltage is applied for an extremely short time, the display is returned to pale blue. Alternatively, when blue display or white display is, as such, allowed to stand without applying a voltage, the display may be kept for a long time to record it. In order to display or record character data or image data, for example, the electrode positioned at the back of a device is kept as a prescribed standard potential (e.g., 0 V), a driver layer is provided at the electrode positioned on the surface of a device, thereby, the potential at each position on the display surface may be positive or negative relative to the standard potential corresponding to the color of the data (in this case, blue or white). The electrophoretic display device based on such an operation principle can be used for various electronic equipments comprising data display means.

<<Electronic Equipments>>

The electronic display device of the present invention can be used, for example, as a data displaying means, for electronic equipments. The electronic equipments of the present invention are those comprising data displaying means, wherein each of the data display means comprises the electrophoretic display device of the present invention. As used herein, the term "data displaying means" refers to a means for displaying character data or image data. The electronic equipments of the present invention are the same as the previously known electronic equipments, except that each of the data display means is the electrophoretic display device of the present invention. For this reason, parts other than the data displaying means may be formed as those in the previously known electronic equipments. In other words, the electronic equipments of the present invention can be obtained by the replacement of the data displaying means in the previously known electronic equipments with the electronic display device of the present invention.

Electronic equipments to which the electronic display device of the present invention can be applied are not particularly limited, so far as each of them comprises a data displaying means. Examples thereof may include personal computers, workstations, word processors, IC cards, IC tags, electronic notepads, electronic dictionary, IC recorders, electronic books, electronic papers, electronic notebooks, electric desktop calculators, electronic newspapers, electronic white boards, direction boards, advertisement boards, various displays, TV sets, DVD players, digital still cameras, view finder-type or monitor direct view-type video cameras, car navigation systems, mobile phones, videophones, pagers, mobile terminals, POS terminals, and various equipments having touch panels. These electronic equipments have previously been known, from which the electronic equipments of the present invention can be obtained by the replacement of the data displaying means with the electrophoretic display device of the present invention.

Description of Embodiments

Referring to the drawings, the process for producing a sheet for electrophoretic display according to the present invention will be described below by way of some embodiments; however, the scope of the present invention is not limited to these descriptions. In addition to the following embodiments, the present invention can also be practiced after appropriate alternation or modification in such a range that the gist of the present invention is not deviated, and all of them are included in the scope of the present invention.

FIGS. 1(a) and (b) are a cross-sectional view and a plane view schematically showing one example of the sheet for electrophoretic display according to the present invention, respectively. The sheet for electrophoretic display 70 has a layer containing microcapsules 20, 20, . . . , and 20 formed on electrically conductive layer 14 of substrate sheet 10 in which the electrically conductive layer 14 is formed on substrate film 12. In this embodiment, the substrate film 12 is a transparent substrate film, for example, made of a synthetic resin such as PET, and the electrically conductive layer 14 is a transparent electrode, for example, made of an electrically conductive material such as ITO.

As shown in FIG. 1(a), approximately spherically shaped microcapsules 20, 20, . . . , and 20 are arranged substantially in a monolayer form and substantially densely on the surface of the substrate sheet 10. Each of the microcapsules 20, 20, . . . , and 20 include dispersion 24 for electrophoretic display containing electrophoretic particles 26, 26, . . . , and 26, in approximately spherically shaped capsule shell 22.

The microcapsules 20, 20, . . . , and 20 are supported on the substrate sheet 10 in the state where they are embedded in binder 32. The binder 32 forms no clear layer, only places where each of the microcapsules 20, 20, . . . , and 20 comes in contact with the substrate 10, and only places where each adjacent two of the microcapsules 20 and 20 come in contact with each other, may be connected with a small amount of the binder 32. In addition, when the binder 32 coating the microcapsules 20, 20, . . . , and 20 is made to be sufficiently thicker than the average particle diameter of the microcapsules 20, 20, . . . , and 20, the binder 32 can have the function of protecting the microcapsules 20, 20, . . . , and 20.

As shown in FIG. 1(b), the microcapsules 20, 20, . . . , and 20 are arranged only on a part, in the width direction, of the surface of the substrate sheet 10, and form microcapsule supporting part 18. At the remaining part, formed is electrically conductive layer exposing part 16 in which the electrically conductive layer 14 is exposed. In this figure, the electrically conductive layer 14 forms many linear electrodes extending in the width direction, but the electrically conductive layers 14 may be formed uniformly on the entire surface of the substrate sheet 10.

In addition, in the sheet 70 for electrophoretic display which is actually produced and used, the microcapsules 20, 20, . . . , and 20 are mutually pressed and deformed to form a non-spherical shape, or a part of the microcapsules 20, 20, . . . , and 20 are slightly floated relative to the surface of the substrate sheet 10, or some parts of the microcapsules 20, 20, . . . , and 20 are overlaid. In some cases, the microcapsules 20, 20, . . . , and 20 may be present in a multilayer form.

Figure 2:
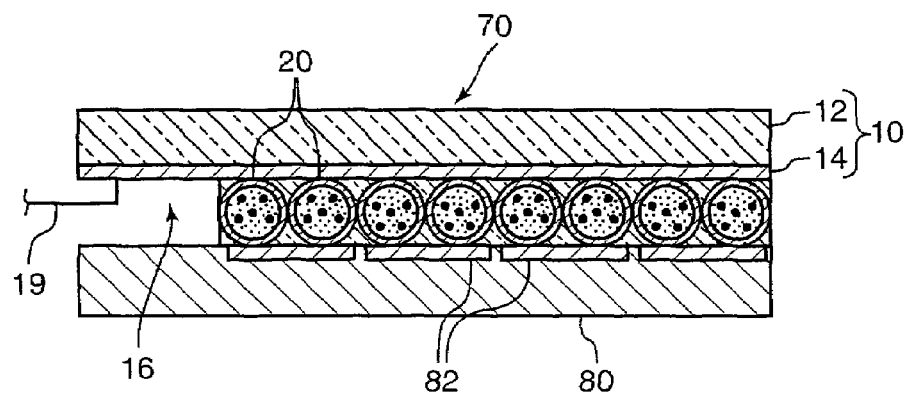
FIG. 2 is a cross-sectional view schematically showing one example of the electrophoretic display device of the present invention.

FIG. 2 is a cross-sectional view schematically showing one example of the electrophoretic display device of the present invention. This electrophoretic display device is one having a data displaying part, wherein the data displaying part is formed with the sheet 70 for electrophoretic display. In the sheet 70 for electrophoretic display, opaque supporting sheet 80 on which ordinary opaque electrodes 82, 82, . . . , and 82, are formed, is laid on the surfaces of the microcapsules 20, 20, . . . , and 20.

To the electrically conductive layer 14 of the sheet 70 for electrophoretic display, connected is wiring 19 for connecting to an external circuit. The sheet 70 for electrophoretic display has the electrically conductive exposing part 16, in which the microcapsules 20, 20, . . . , and 20, and the binder 32 are not present, but the electrically conductive layer 14 is exposed is present, so that wiring becomes easy by the connection of the wiring 19 to the electrically conductive layer 14 of the electrically conductive layer exposing part 16.

The electrophoretic display device of this embodiment is used in such a manner that the supporting sheet 80 is arranged on the back and the sheet 70 for electrophoretic display is arranged on the front. When a voltage is applied, by addressing, between the electrode 82 and the electrically conductive layer 14, which are arranged on both sides so as to hold the microcapsules 20, 20, . . . , and 20, the voltage is applied to the microcapsules 20, 20, . . . , and 20 at a position to which the voltage is applied. The electrophoretic particles 26, 26, . . . , and 26, encapsulated in each of the microcapsules 20, 20, . . . , and 20 migrate to the side of the electrode 82 or the side of the electrically conductive layer 14. At this time, when observed from the outer surface side of the opaque substrate sheet 10, at each address position, the displaying color of the microcapsules 20, 20, . . . , and 20 is changed depending on the migrating state of the electrophoretic particles 26, 26, . . . , and 26, and character data or image data can be displayed as their aggregate.

The electrophoretic display particles 26, 26, . . . , and 26, after allowed to migrate by the application of a voltage, keep their own migration positions, if no voltage is applied, until another voltage is applied newly. For this reason, character data or image data displayed at the time of voltage application is continuously displayed, even after the voltage application is stopped.

Figure 3:
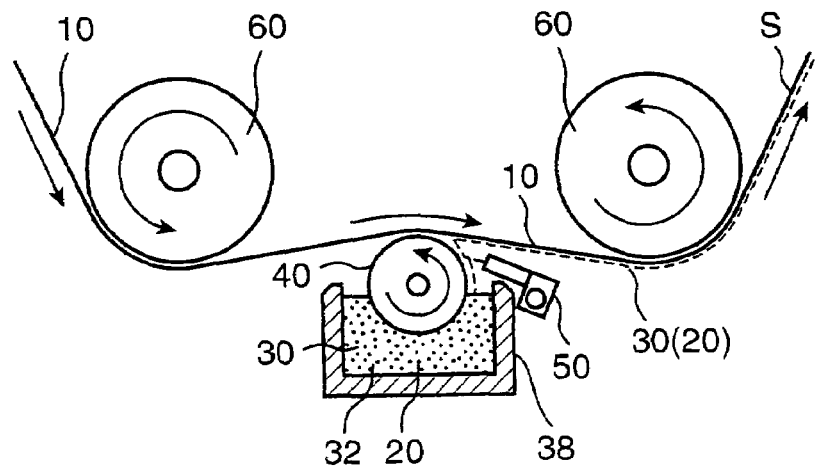
FIG. 3 is a cross-sectional view schematically showing one example of a coating apparatus and a coating step used in the process for producing a sheet for electrophoretic display according to the present invention.
Figure 4:
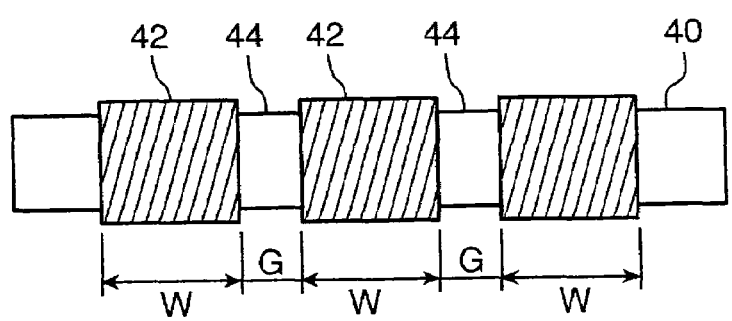
FIG. 4 is a front view schematically showing a coating roll used in the process for producing a sheet for electrophoretic display according to the present invention.
Figure 5:
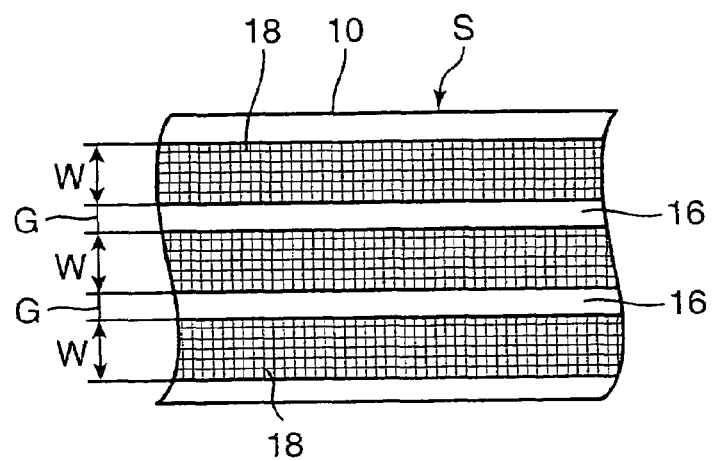
FIG. 5 is a plane view schematically showing one example of a sheet for electrophoretic display which is produced by the process for producing a sheet for electrophoretic display according to the present invention.

FIGS. 3 to 5 schematically show one example of the step and one example of the apparatus, which are used in the process for producing a sheet for electrophoretic display according to the present invention.

FIG. 5 shows strip-shaped sheet S for electrophoretic display as a raw material for producing the sheet 70 for electrophoretic display. In the sheet S for electrophoretic display, three stripe-shaped microcapsule supporting parts 18, 18, and 18, each having width W, are discontinuously formed in the width direction of the sheet. Two electrically conductive layer exposing parts 16 and 16 on which the electrically conductive layer 14 of the substrate sheet 10 is exposed in width G is present between each two of the microcapsule supporting parts 18, 18, and 18.

The sheet S for electrophoretic display can be produced, for example, using a microgravure coater as shown in FIG. 4. The microgravure roll 40 has the same material and structure as those of an ordinary microgravure roll, but is considerably smaller than the outer diameter of a coating roll in the gravure coater widely used and, for example, has a diameter of 20 to 60 mm.

As shown in FIG. 4, the microgravure roll 40 has gravure pattern parts 42, 42, and 42 on which fine irregularities are formed by mechanical carving or etching treatment, on the outer circumferential surface. In FIG. 4, the gravure pattern parts 42, 42, and 42 are densely formed in the state where slant straight concave grooves are wound spirally on the external circumferential surface.

The gravure pattern parts 42, 42, and 42 are discontinuously arranged at three places apart in the axially direction of the microgravure roll 40. The width of each of the gravure pattern parts 42, 42, and 42 is set depending on the width W of each of the microcapsule supporting parts 18, 18, and 18 as shown in FIG. 5. The interval of the gravure pattern parts 42, 42, and 42 is set depending on the width G of each of the electrically conductive layer exposing parts 16 and 16. The external circumferential diameter at the intermediate parts 44 and 44 between each two of the gravure pattern parts 42, 42, and 42 is set to be smaller than the external circumferential diameter of the gravure pattern parts 42, 42, and 42.

The sum width of the gravure pattern parts 42, 42, and 42 is set depending on the width of the substrate sheet 10. It is not necessary that the sum width of the gravure pattern parts 42, 42, and 42 is consistent with the width of the substrate sheet 10.

As shown in FIG. 3, the microgravure roll 40 is supported rotatably in the horizontal state, and is rotation-driven with a motor (not shown). Below the microgravure roll 40 is provided with reservoir 38 containing coating solution 30. The coating solution 30 is a dispersion containing microcapsules 20, 20, . . . , and 20, binder 32, and the like in a dispersing medium. When binder 32 is in liquid state, the coating solution 30 can be prepared only by dispersing the microcapsules 20, 20, . . . , and 20 in the binder 32 without using a dispersing medium.

A part of the microgravure roll 40 is in contact with the coating solution 30, and the coating solution 30 attached to the gravure pattern parts 42, 42, and 42 is transported to the upper side by rotation of the microgravure roll 40.

As shown in FIG. 3, a pair of guide rolls 60 and 60 is arranged back and forth, apart from the microgravure roll 40, on the upper side of the microgravure roll 40. The lower end of each of the guide rolls 60 and 60 is arranged at the same position as the upper end of the microgravure roll 40 or at a position slightly lower than the upper end of the microgravure roll 40.

The strip-shaped substrate sheet 10 is continuously supplied along the lower side of one guide roll 60, and is forwarded along the lower side of the other guide roll 60 by way of the upper side of the microgravure roll 40. The substrate sheet 10 wound in a roll is successively pulled out on the upstream side, not shown, and is allowed to run.

At a position of the microgravure roll 40, a relatively small pressure from the microgravure roll 40 is applied to the substrate sheet 10, and the substrate sheet 10 is deformed so as to change its running direction towards a upper direction. In such a manner, the system of coating by slightly applying a pressure to only one side of a material to be coated is called the kiss coating system. The guide rolls 60 and 60 which push the substrate sheet 10 from the upper direction are situated at the respective positions apart from the microgravure roll 40, a great force is not applied to the substrate sheet 10 by holding the substrate sheet 10 between the microgravure roll 40 and any of the guide rolls 60 and 60. The adjustment of a difference in positions of the guide rolls 60 and 60 and the microgravure roll 40 in the up and down directions can control the amplitude of a pressure applied to the substrate sheet 10.

In FIG. 3, the running direction of the substrate sheet 10 is from left to right of the figure as shown by arrows. The rotation direction of the guide rolls 60 and 60 and the rotation direction of the microgravure roll 40 are in the counterclockwise direction. As a result, the external circumferential surface of the microgravure roll 40 reversely moves from right to left of the figure, relative to the substrate sheet 10 which moves from left to right of the figure. Such a coating system is called the reverse system.

The coating solution 30 attached to the gravure pattern part 42 with the rotation of the microgravure roll 40 is supplied to the underside of the substrate sheet 10, and coating is carried out. The irregular shape of the gravure pattern part 42 lifts and transports, with high efficiency, the coating solution 30 containing the microcapsules 20, 20, . . . , and 20.

The appropriate adjustment of the running speed of the substrate sheet 10 and the rotating speed of the microgravure roll 40 makes it possible that the coating solution 30 is coated on the underside of the substrate sheet 10 at a substantially constant thickness. At the intermediate parts and both end parts where the gravure pattern parts 42, 42, and 42 are not present, of the microgravure roll 40, the coated solution 30 is not coated on the substrate sheet 10.

On a slightly front side of a position where the coating solution 30 comes in contact with the substrate sheet 10, doctor knife mechanism 50 is arranged in the vicinity of the external circumferential surface of the microgravure roll 40. The coating solution 30 attached to the microgravure roll 40 and lifted from the reservoir 30 is coated by coming in contact with the substrate sheet 10 after the solution is adjusted to a thickness corresponding to the gap between the tip of the doctor knife mechanism 50 and the external circumferential surface of the microgravure roll 40. This makes it possible to more precisely adjust the thickness of the coating solution 30 formed on the substrate sheet 10.

The coating thickness of the coating solution 30 is usually set to be slightly thicker than the average particle diameter of the microcapsules 20, 20, . . . , and 20, and preferred is a thickness smaller than two hold the average particle diameter of the microcapsules 20, 20, . . . , and 20. Therefore, it is desirable that the position at which the tip of the doctor knife mechanism 50 is disposed may be adjusted depending on the average particle diameter of the microcapsules 20, 20, . . . , and 20 to be coated. Of course, it is also desirable that the rotation number of the microgravure roll 40 and the running speed of the substrate sheet 10 may be set depending on the average particle diameter of the microcapsules 20, 20, . . . , and 20.

In the coating carried out with an ordinary gravure coater, a gravure roll and a backup roll firmly hold a substrate sheet when a coating solution is transferred from the gravure roll to the substrate sheet. Therefore, the coating solution may be pushed out to the outside of the width of the substrate sheet, and may be protruded and attached to the backside (upper side) of the substrate sheet. However, in a microgravure coater as described above, the microgravure 40 is only slightly pressed against the substrate sheet 10, the coating solution 30 is rarely protruded and attached to the backside of the substrate sheet 10. Unless a great pressure is applied to the coating solution 30, the microcapsules 20, 20, . . . , and 20 are rarely damaged or not excessively deformed.

As shown by the broken line in FIG. 3, in a microgravure coater of the reverse coating system, the coating solution 30 attached to the external circumferential surface of the microgravure roll 40 is transferred onto the substrate sheet 10 at the contact point between the microgravure roll 40 and the substrate sheet 10. At this time, the substrate sheet 10 only slightly comes in contact with the microgravure roll 40, an excessive pressure is not applied to the microcapsules 20, 20, . . . , and 20. In addition, at the contact point, the coating solution 30 is pulled in the reverse direction by both of the substrate sheet 10 and the microgravure roll 40, and an excessive shear is applied to the coating solution, so that the coating solution is substantially uniformed transferred onto the substrate sheet 10. The gravure pattern of the microgravure roll 40 is rarely transferred onto a layer of the coating solution 30 formed on the substrate sheet 10.

The sheet S for electrophoretic display in which the coating solution 30 has been coated on the substrate sheet 10 at a prescribed thickness makes the substrate sheet 10 firmly support the microcapsules 20, 20, . . . , and 20 by the drying of the coating solution 30. The evaporation of a solvent contained in the coating solution 30 can allow the microcapsules 20, 20, . . . , and 20 to bond to the substrate sheet 10 with the remaining binder 32. Alternatively, the binder 32 contained in the coating solution 30 may be cured to form a binder layer in which the microcapsules 20, 20, . . . , and 20 are embedded. For allowing the microcapsules 20, 20, . . . , and 20 to bond to the substrate sheet 10, or curing the binder 32, for example, air blast drying, heating, or radiation irradiation may be carried out.

After obtaining the sheet S for electrophoretic display in which the microcapsules 20, 20, . . . , and 20 have been supported on the substrate sheet 10, a part of the sheet S for electrophoretic display is cut to obtain the sheet 70 for electrophoretic display as shown in FIG. 1.

Figure 6:
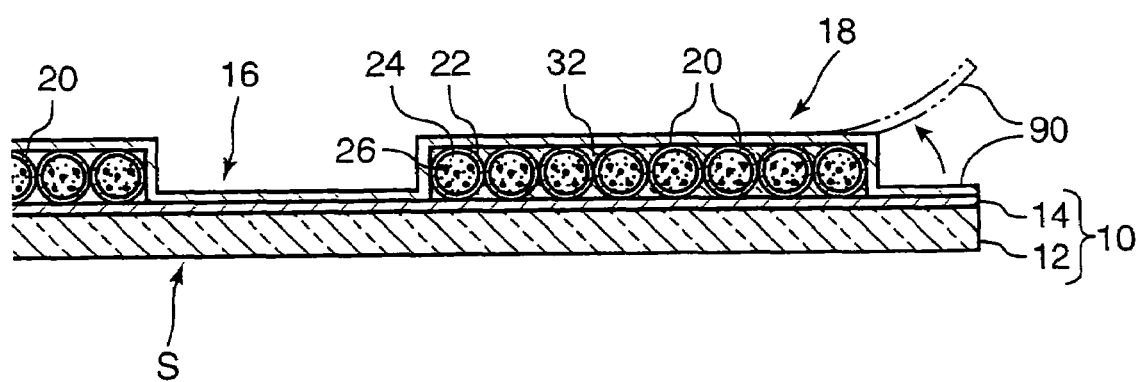
FIG. 6 is a cross-sectional view schematically showing one example of the sheet for electrophoretic display according to the present invention with a release film attached thereto.
Figure 7:
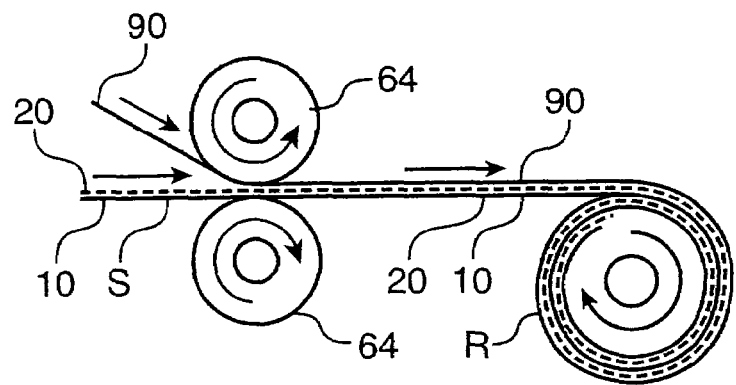
FIG. 7 is a cross-sectional view schematically showing a step of attaching a release film to the sheet for electrophoretic display according to the present invention.

FIGS. 6 and 7 schematically show the sheet S for electrophoretic display to which release film 90 has been attached, as well as attaching work.

As shown in FIG. 7, the sheet S for electrophoretic display in which the microcapsules 20, 20, . . . , and 20 have been supported on the substrate sheet 10 is continuously run, during which the release film 90 is supplied in the running direction, and the sheet S for electrophoretic display and the release film 90 are held with nip rolls 64 and 64, so that the release film 90 is attached to the sheet S for electrophoretic display. A pressure to be applied at this time may be to such an extent that the release film 90 is slightly attached to the sheet S for electrophoretic display, and such a great pressure is not to be applied that the microcapsules 20, 20, . . . , and 20 may be damaged or excessively deformed.

The sheet S for electrophoretic display is brought into contact, under pressure, with the release film 90, so that the release film 90 can be attached by a sufficient force and, at the same time, the effect of smoothing the surface of the sheet S for electrophoretic display can also be enhanced. When a smooth surface of the release film 90 is bought into contact, under pressure, with the sheet S for electrophoretic display, for example, even if the microcapsules 20, 20, . . . , and 20 are slightly floated from the substrate sheet 10, such a floating can be eliminated by pressing down with the release film 90. In addition, even if the surface of the microcapsules 20, 20, . . . , and 20 or the binder 32 has fine irregularities or undulation, it can be made sufficiently uniform by coming in contact, under pressure, with the smooth surface of the release film 90.

As shown in FIG. 6, the release film 90 coats both of the microcapsule supporting part 18 and the electrically conductive layer exposing part 16 in the sheet S for electrophoretic display. The release film 90 can protect the microcapsules 20, 20, . . . , and 20 and, at the same time, can also protect the surface of the electrically conductive layer exposing part 16.

When the release film 90 is attached at a stage where the surface of the sheet S for electrophoretic display still has adherability or flexibility, the sheet S for electrophoretic display and the release film 90 are surely combined, and the effect of surface smoothing is well exhibited.

The sheet S for electrophoretic display with the release film 90 attached thereto can be wound on a roll into the form of wound roll R. When the sheet is in the form of the wound roll R, handling such as storage and transport becomes easy. The winding of the sheet under conditions such that a winding pressure is applied in the form of the wound roll R at the time of winding work, the smoothing of the surface of the sheet S for electrophoretic display is promoted by the release film 90.

When the sheet S for electrophoretic display is used, the release film 90 on the surface thereof may be removed by pulling out the sheet from one end of the wound roll R so that the sheet is released. As shown in FIG. 6, the release film 90 can easily be removed from the surface of the sheet S for electrophoretic display by separating off an end thereof. The sheet S for electrophoretic display from which the release film 90 has been removed can be, as it is, or after cut into an appropriate size, used for the production of the electrophoretic display device 70 as shown in FIG. 2.

In the wound roll R, the release film 90 is interposed between the adjacent layers of the sheet S for electrophoretic display, so that the adjacent layers of the sheet S for electrophoretic display do not firmly adhered to each other or the microcapsules 20, 20, . . . , and 20 do not cause blocking with the adjacent substrate sheet 10.

In particular, when the sheet S for electrophoretic display is stored or handled at an intermediate step of laying the sheet S for electrophoretic display on another film or member, or bonding the sheet S for electrophoretic display to another film or member, the surfaces of the microcapsules 20, 20, . . . , and 20 in the sheet S for electrophoretic display may have strong adherability. For this reason, for example, until the coating solution 30 containing the microcapsules 20, 20, . . . , and 20 is coated on the substrate sheet 10, followed by drying, and the binder 32 contained in the coating solution 30 is sufficiently cured, the microcapsules 20, 20, . . . , and 20 may easily be detached or shifted from the substrate sheet 10, or the surfaces thereof may easily be damaged. In such a case, the protection by the application of the release film 90 is effective.

EXAMPLES

The present invention will be described below more specifically by way of the following Examples; however, the present invention is not restricted by these Examples. The present invention can also be practiced after appropriate alternation or modification in such a range that the above- or below-mentioned gist is not deviated, and all of them are included in the technical scope of the present invention. In the following, the term "% by weight" may be referred to simply as "%" in some cases.

Example 1

<Production of Dispersion for Electrophoretic Display>

First, 0.5 g of aminopropyltriethoxysilane (trade name: KBM-903, available from Shin-Etsu Chemical Co., Ltd.) was mixed with 90 g of methanol to dissolve it, to which 0.5 g of 2.5% aqueous ammonia was added.

To this solution was added 50 g of titanium oxide (trade name: TIPAQUE CR-97, available from Ishihara Sangyo Kaisha, Ltd.; average particle diameter, 0.25 μm) which was subject to ultrasound dispersing treatment at 50° C. for 60 minutes while stirring. Then, 1.5 g of isopropylisostearoyl titanate (trade name: PENACT KR-TTS, available from Ajinomoto Co., Inc.) was added thereto, which was subjected to ultrasound dispersing treatment for another 60 minutes. This dispersion was centrifuged to recover the titanium oxide, which was dried at 120° C., thereby obtaining surface treated titanium oxide.

Then, 14 g of surface treated titanium oxide was added to 130 g of dodecylbenzene, which was subjected to ultrasound dispersing treatment at 50° C. for 30 minutes. This dispersion was mixed with 2 g of a blue dye (trade name: OIL BLUE F, available from Chuo Synthetic Chemical Co., Ltd.) to dissolve it, thereby obtaining a dispersion for electrophoretic display.

<Production of Microcapsules for Electrophoretic Display>

First, 24 g of gum arabic and 8 g of gelatin were dissolved in 200 g of water, the temperature of which was kept at 43° C. This solution was stirred with a high speed dispersing machine (trade name: ROBOMICS, available from Tokushu Kika Kogyo Co., Ltd.), during which 146 g of a dispersion for electrophoretic display at 43° C. was added. The speed of stirring was then gradually increased, and the mixture was stirred at 1,000 rpm for 10 minutes, thereby obtaining a suspension.

To this suspension was added 750 g of warm water at 43° C., to which 20 g of a 10% aqueous acetic acid solution was added. This mixture was then cooled to 10° C. or lower, at which temperature this mixture was kept for 1 hour.

Then, 10 g of 37% formalin and 45 g of 10% aqueous sodium carbonate solution were added thereto, the temperature of which was raised to 25° C. At this temperature, maturing was carried out for 5 hours, thereby obtaining a dispersion of microcapsules for electrophoretic display in which the dispersion for electrophoretic display is encapsulated in capsule shells made of gum arabic and gelatin.

The average particle diameter of the microcapsules for electrophoretic display contained in the resulting dispersion was measured with a laser scattering particle size distribution analyzer (trade name: LA-910, available from Horiba, Ltd.), and found to be 70 μm as expressed in volume average particle diameter.

<Production of Sheet for Electrophoretic Display>

The resulting dispersion of the microcapsules for electrophoretic display was suction filtered to obtain a microcapsule paste with the amount of microcapsules contained therein being 51%. Then, 19.6 g of this microcapsule paste, 2.6 g of a binder (trade name: POLYMENT SK-1000, available from Nippon Shokubai, Co., Ltd.; concentration, 38% by weight), and 5.3 g of deionized water were sufficiently mixed, thereby obtaining a coating solution (1) containing the microcapsules for electrophoretic display. The solid concentration was 40% by weight, and the viscosity was 62 KU. The viscosity was measured using a Klebs viscometer (trade name: KU-1, available from Brookfield Engineering Laboratories, Inc.).

In this Example, as a coating apparatus, a microgravure coater (available from Yasui Seiki Co., Ltd.) with a fundamental structure as shown in FIG. 3. There was used a microgravure roll having a diameter of 20 mm and a coating width of 300 mm, in which a gravure pattern had been graved on the whole external circumferential surface. The gravure pattern was lattice-like one in which slant linear grooves were arranged by crossing with each other, and had a density of 9.84 cm$^{-1}$ (25 inch$^{-1}$), a depth of 300 μm, and a cell volume of 170 mL/m$^2$. This gravure pattern was discontinuously cut in the axial direction of the gravure roll, so that the microgravure roll was processed into the form in which gravure pattern parts having a width of 70 mm were arranged at three places at an interval of 45 mm as shown in FIG. 4.

As a substrate sheet, a transparent electrically conductive film having a thickness of 125 μm (trade name: TORAY HIGHBEAM NT02, available from Toray Industries, Inc.; total light transmittance, 83.5%) was continuously run at a running speed of 1 m/min. The rotation number of the microgravure roll was set at 64 rpm (reverse rotation relative to the running direction of the substrate sheet), and the above coating solution (1) was coated on a substrate sheet. The resulting sheet for electrophoretic display was dried with a jet drier which forcibly blasts at 90° C. and a wind speed of 10 m/min.

In the resulting sheet for electrophoretic display, the microcapsules were supported on the electrically conductive layer of the substrate sheet substantially in a monolayer and substantially densely. As shown in FIG. 5, in the microcapsule layer, microcapsule supporting parts and electrically conductive layer exposing parts were alternately arranged in the width direction. The width W of the microcapsule supporting parts was 70 mm, and the width G of the electrically conductive exposing parts was 45 mm. Neither microcapsules protruding from the microcapsule supporting parts, nor microcapsules attached on the back of the substrate sheet were observed. In addition, neither damage nor excessive deformation of the microcapsules was observed in the microcapsule supporting parts.

Example 2

<Production of Coating Solution>

First, 19.6 g of the microcapsule paste obtained in the same manner as described in Example 1, 2.6 g of a binder (trade name: POLYMENT SK-1000, available from Nippon Shokubai, Co., Ltd.; concentration, 38% by weight), and 2.2 g of deionized water were sufficiently mixed, thereby obtaining a coating solution (2) containing the microcapsules for electrophoretic display. The solid concentration was 45% by weight, and the viscosity was 75 KU.

<Production of Sheet for Electrophoretic Display>

In this example, as a coating apparatus, the same microgravure coater as described in Example 1 was used. The gravure pattern was lattice-like one in which slant linear groves were arranged by crossing with each other, and had a density of 6.7 cm$^{-1}$ (17 inch$^{-1}$), a depth of 430 μm, and a cell volume of 188 mL/m$^2$.

As a substrate sheet, a transparent electrically conductive film with an adhesive layer, having a thickness of 125 μm (trade name: HIGHBEAM CF98, available from Toray Industries, Inc.; total light transmittance, 86.5%) was continuously run at a running speed of 1 m/min.

A sheet for electrophoretic display was produced in the same manner as described in Example 1, except that the rotation number of the microgravure roll was set at 180 rpm (reverse rotation relative to the running direction of the substrate sheet), and the above coating solution (2) was coated on the substrate sheet.

The resulting sheet for electrophoretic display had excellent quality similar to that of the sheet for electrophoretic display obtained in Example 1.

Example 3

<Production of Coating Solution>

First, 19.6 g of the microcapsule paste obtained in the same manner as described in Example 1, 2.2 g of a binder (trade name: SUPER FLEX 550, available from Dai-ichi Kogyo Seiyaku Co., Ltd.; concentration, 45% by weight), and 5.7 g of deionized water were sufficiently mixed, thereby obtaining a coating solution (3) containing the microcapsules for electrophoretic display. The solid concentration was 40% by weight, and the viscosity was 73 KU.

<Production of Sheet for Electrophoretic Display>

A sheet for electrophoretic display was produced in the same manner as described in Example 1, except that the rotation number of the microgravure roll was set at 56 rpm (reverse rotation relative to the running direction of the substrate sheet), and the above coating solution (3) was coated on the same substrate sheet as used in Example 2.

The resulting sheet for electrophoretic display had excellent quality similar to that of the sheet for electrophoretic display obtained in Example 1.

Example 4

A sheet for electrophoretic display was produced in the same manner as described in Example 1, except that the rotation number of the microgravure roll was set at 140 rpm (reverse rotation relative to the running direction of the substrate sheet), and the above coating solution (3) obtained in Example 3 was coated on the substrate sheet.

The resulting sheet for electrophoretic display had excellent quality similar to that of the sheet for electrophoretic display obtained in Example 1.

Comparative Example 1

In this comparative Example, as a coating apparatus, an ordinary gravure coater was used, which was not a microgravure coater. This gravure coater is such that a gravure roll and a backup roll are arranged opposite, a substrate sheet was run by holding therebetween, and a coating solution is coated on the substrate sheet from the gravure roll. This gravure coater is neither of the kiss system nor of the reverse system. There was used a gravure roll having a diameter of 100 mm and a coating width of 300 mm, in which a gravure pattern had been graved on the whole external circumferential surface. The gravure pattern was lattice-like one in which slant linear groves were arranged spirally, and had a density of 9.84 cm$^{-1}$ (25 inch$^{-1}$), a depth of 300 μm, and a cell volume of 170 mL/m². This gravure pattern was cut in the same manner as described in Example 1, so that the microgravure roll was processed into the form in which gravure pattern parts having a width of 70 mm were arranged at three places at an interval of 45 mm.

As a substrate sheet, the same substrate sheet as used in Example 1 was continuously run at a running speed of 1 m/min.

A sheet for electrophoretic display was produced in the same manner as described in Example 1, except that the rotation number of the microgravure roll was set at 1.5 rpm (forward rotation relative to the running direction of the substrate sheet), and the coating solution (1) obtained in Example 1 was coated on the same substrate sheet as used in Example 1.

The resulting sheet for electrophoretic display had slant streaks appeared on the microcapsule layer, and the microcapsules for electrophoretic display were not substantially densely supported. In addition, the substrate sheet had flaws caused by the pressure of the backup roll.

Comparative Example 2

In this Comparative Example, as a coating apparatus, a die coater was used. The slot die of this die coater was discontinuously clogged in its length direction, so that a coating solution supplied from the slot die was coated on a substrate sheet in a discontinuous stripe manner.

An attempt was made to coat the coating solution (1) obtained in Example 1 on the same substrate sheet as used in Example 1. The microcapsules for electrophoretic display contained in the coating solution were, however, broken in a liquid supplying pump for supplying the coating solution to the slot die, so that no sheet for electrophoretic display could be produced.

Example 5

Each of various release films as shown below was overlaid on the microcapsule layer of the sheet for electrophoretic display obtained in Example 1, and they were adhered to each other by the application of a road of 49 N/cm² (5 kgf/cm²) at room temperature, after which the laminated sheet was wound on a roll, thereby obtaining a wound roll.

After matured at room temperature for one day, the laminated sheet was pulled out from the wound roll, and the release film was removed, thereby obtaining the sheet for electrophoretic display. At this time, the removability of each release film was evaluated by the following criteria.

Then, another transparent electrically conductive film (trade name: TORAY HIGHBEAM NT02, available from Toray Industries, Inc.) was overlaid on the microcapsule layer of the sheet for electrophoretic display so that the electrically conductive layer of the film was opposite thereto, which was laminated at a treating speed of 1 mm/s by the application of a load of 39 N/cm² (4 kgf/cm²) at a temperature of 120° C. At this time, the removability of another electrically conductive film was evaluated by the following criteria.

<Evaluation Criteria>

Excellent: When a release film is removed, there is no resistance to the removal and, when another electrically conductive film is attached, a laminated sheet is obtained in which both films are adhered to each other without any gap.

Good: When a release film is removed, there is no resistance to the removal; however, when another electrically conductive film is attached, a laminated sheet has some portion in which adhesiveness is poor. There is no problem in practical use.

Bad: When a release film is removed, there is a great resistance to the removal, and microcapsules on the removed plane are damaged, which is not practical.

<Release Films and Their Evaluation>

Release film 1: a gently pressure-sensitive adhesive polyethylene film having a thickness of 50 μm (trade name: TRETEC 7531, available from Toray Synthetic Film Co., Ltd.)=evaluation: Excellent Release film 2: a gently pressure-sensitive adhesive polyethylene film having a thickness of 60 μm (trade name: TRETEC 7121, available from Toray Synthetic Film Co., Ltd.)=evaluation: excellent Release film 3: a gently pressure-sensitive adhesive polyethylene film having a thickness of 100 μm (trade name: TRETEC 7721, available from Toray Synthetic Film Co., Ltd.)=evaluation: excellent Release film 4: a gently pressure-sensitive adhesive polyethylene film having a thickness of 100 μm (trade name: TRETEC 7111, available from Toray Synthetic Film Co., Ltd.)=evaluation: excellent Release film 5: a gently pressure-sensitive adhesive polyethylene film having a thickness of 60 μm (trade name: PROTECT TAPE 622B, available from Sekisui Chemical Co., Ltd.)=evaluation: good Release film 6: a gently pressure-sensitive adhesive polyethylene film having a thickness of 70 μm (trade name: SUNITECT PAC2-70, available from Sun A Kaken Co., Ltd.)= evaluation: excellent Release film 7: an unstretched polypropylene film having a thickness of 100 μm (trade name: TORAYFAN NO3931, available from Toray Synthetic Film Co., Ltd.)=evaluation: good Release film 8: a biaxial stretched polypropylene film having a thickness of 50 μm (trade name: PYLEN OTP2002, available from Toyobo Co., Ltd.)=evaluation: good Release film 9: a polyethylene terephthalate (PET) film having a thickness of 125 μm (trade name: LUMIRROR T60, available from Toray Industries, Inc.)=evaluation: bad Example 6

Figure 8:
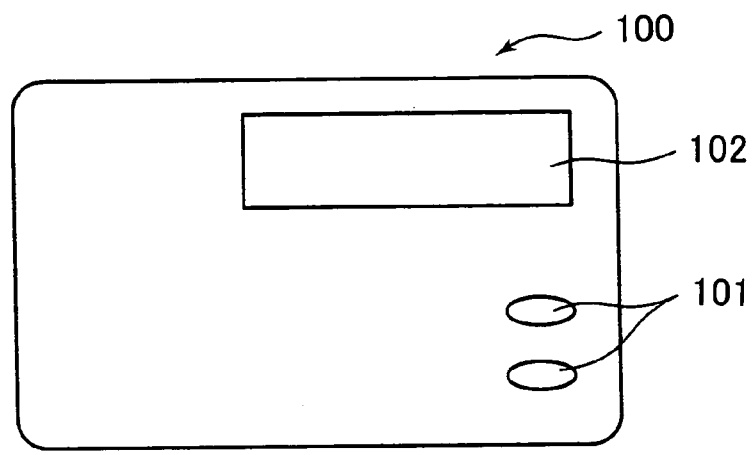
FIG. 8 is a plan view showing one example of an IC card which is one embodiment of an electronic equipment of the present invention.

FIG. 8 is a plan view showing one example of an IC card which is one embodiment of the electronic equipment of the present invention. IC card 100 has two operation buttons 101 and 101, and display panel 102. In the IC card 100, display panel 102 as a data displaying means is the electrophoretic display device of the present invention.

Example 7

Figure 9:
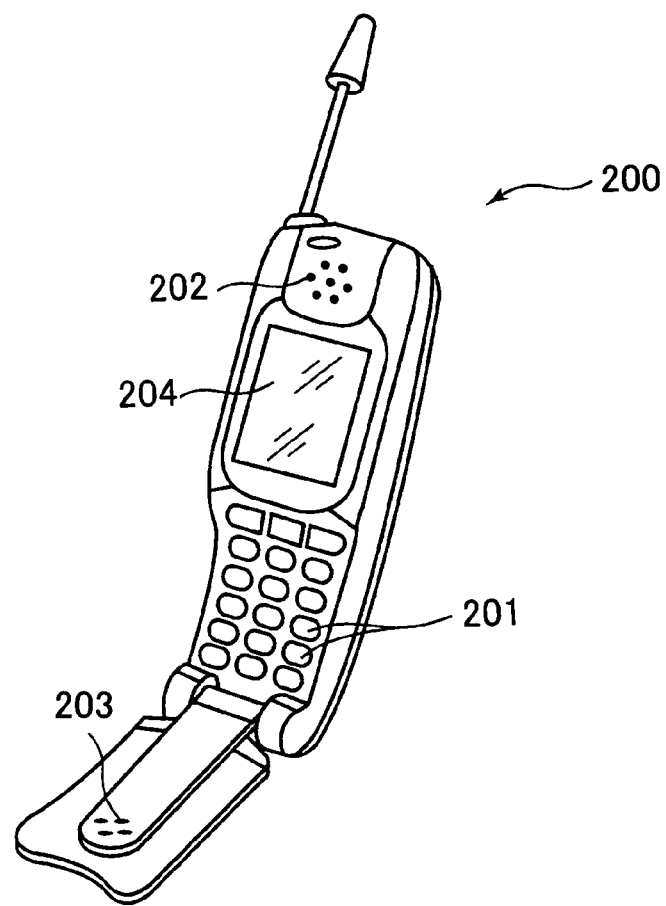
FIG. 9 is a perspective view showing one example of a mobile phone which is another embodiment of the electronic equipment of the present invention.

FIG. 9 is a perspective view showing one example of a mobile phone which is another embodiment of the electronic equipment of the present invention. Mobile phone 200 has two or more buttons 201, 201, . . . , and 201, earpiece 202, mouthpiece 203, and display panel 204. In the mobile phone 200, display panel 204 as a data displaying means is the electrophoretic display device of the present invention.

Example 8

Figure 10:
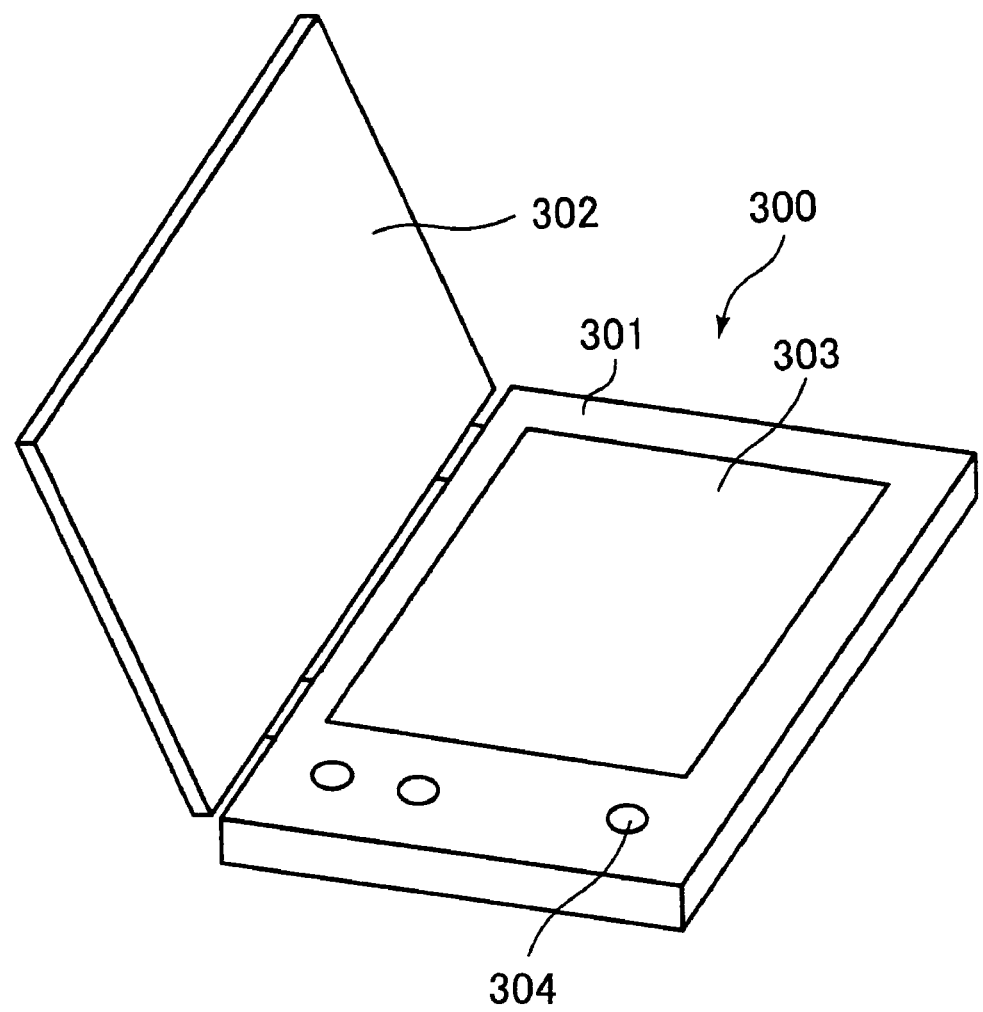
FIG. 10 is a perspective view showing one example of an electronic book which is still another embodiment of the electronic equipment of the present invention.

FIG. 10 is a perspective view showing one example of an electronic book which is still another embodiment of the electronic equipment of the present invention. Electronic book 300 has a book-shaped frame 301, and cover 302 which is provided rotatably relative to the frame 301 (openable and closable). Frame 301 has display device 303 in the state where the display surface is opened, and operating portion 304. In the electronic book 300, display device 303 as a data displaying means is the electrophoretic display device of the present invention.

Example 9

Figure 11:
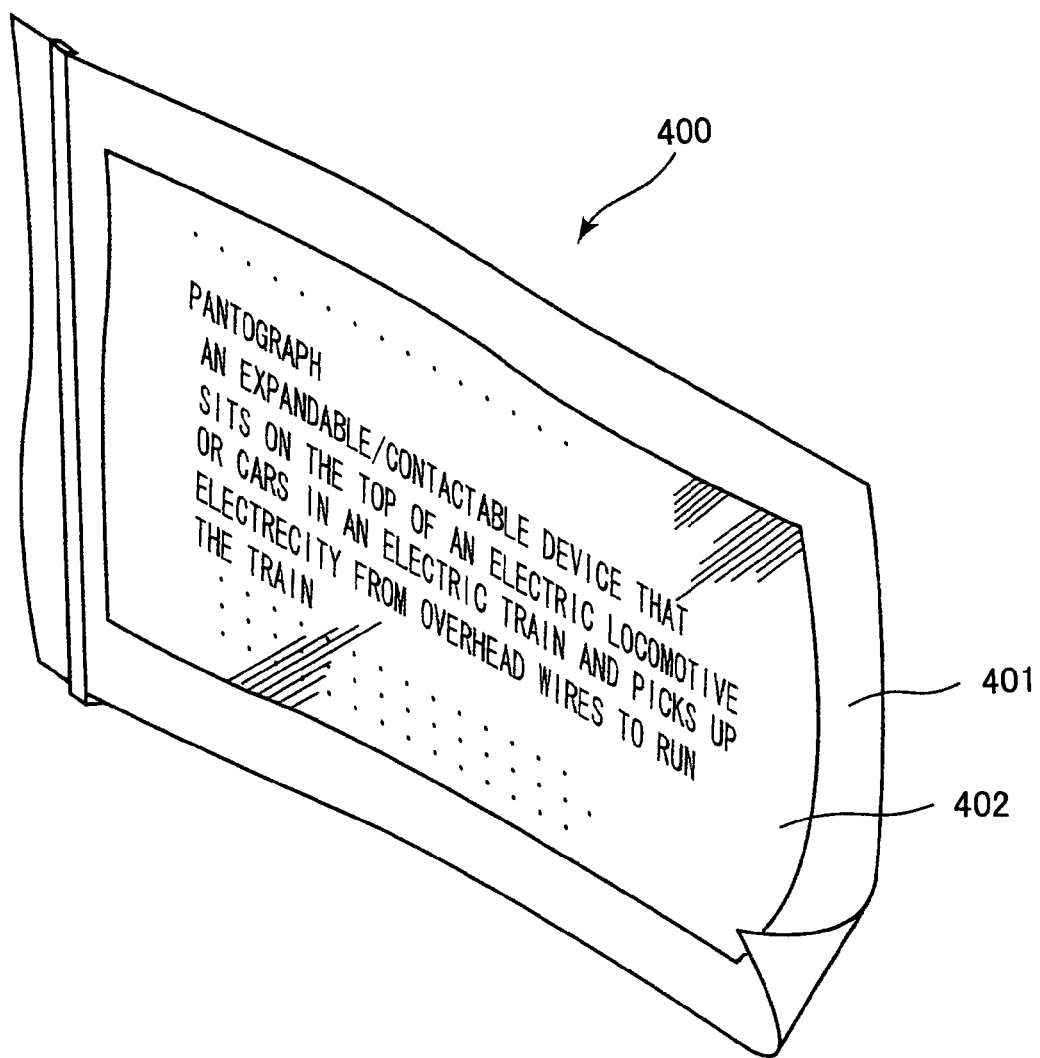
FIG. 11 is a perspective view showing one example of an electronic paper which is still another embodiment of the electronic equipment of the present invention.

FIG. 11 is a perspective view showing one example of an electronic paper which is still another embodiment of the electronic equipment of the present invention. Electronic paper 400 has body 401 formed of a re-writable sheet having the same texture and flexibility as those of a paper, and display unit 402. In the electronic paper 400, display unit 402 as a data displaying means is the electrophoretic display device of the present invention.

The IC card of Example 6, the mobile phone of Example 7, the electronic book of Example 8, and the electronic paper of Example 9 include the electrophoretic display device of the present invention as the data displaying means, so that they are electronic equipments having extremely excellent display properties such as display responsiveness and contrast.

The process for producing a sheet for electrophoretic display according to the present invention makes it possible to produce a sheet for electrophoretic display in which microcapsules for electrophoretic display are arranged on a substrate sheet in a prescribed pattern shape, on an industrial scale with high productivity. The sheet for electrophoretic display of the present invention obtained has the microcapsules for electrophoretic display arranged at a high precision, and therefore, the electrophoretic display device and the electronic equipment using the sheet have neither unevenness of display properties nor display pixel missing, and have extremely excellent display quality. The sheet for electrophoretic display with a release film attached thereto can attain surface protection and have the excellent advantages that handling in the production, as well as storage and transport become easy and, moreover, the surface of the sheet can be smoothened. For this reason, the process for producing a sheet for electrophoretic display, the sheet for electrophoretic display, and its use according to the present invention make a great contribution in the field relevant to electronic equipments comprising data displaying means, as a series of techniques providing data displaying means of extremely excellent display quality.

The invention claimed is:

1. A process of producing a sheet for electrophoretic display in which a layer containing a microcapsule for electrophoretic display is formed on an electrically conductive layer of a substrate sheet with the electrically conductive layer formed on a substrate film, the process comprising:

coating, on a strip-shaped substrate sheet in which an electrically conductive layer is formed on a substrate film, a coating solution containing a microcapsule for electrophoretic display by using a coating apparatus of a kiss•reverse coating system having a coating roll in which a gravure pattern is discontinuously formed in an axial direction of an external circumferential surface; and after the coating of the coating solution, drying the coating solution to form a layer containing the microcapsule on the electrically conductive layer to obtain a sheet for electrophoretic display in which a microcapsule supporting part on which the microcapsule is supported and an electrically conductive layer exposing part on which the electrically conductive layer is exposed are alternately arranged in a width direction of the sheet, the strip-shaped substrate sheet being moved during at least a part of a period in which the coating of the coating solution is carried out.

2. The process according to claim 1, wherein the coating solution containing a microcapsule for electrophoretic display having an average particle diameter of 20 to 200 μm is coated on the substrate sheet.

3. The process according to claim 2, wherein a thickness of the layer containing the microcapsule is 10 to 100 μm as expressed by a thickness after drying.

4. The process according to claim 3, further comprising, after the drying of the coating solution, attaching a release film to the layer containing the microcapsule, and winding the resulting sheet.

5. The process according to claim 2, further comprising, after the drying of the coating solution, attaching a release film to the layer containing the microcapsule, and winding the resulting sheet.

6. The process according to claim 1, wherein a thickness of the layer containing the microcapsule is 10 to 100 μm as expressed by a thickness after drying.

7. The process according to claim 6, further comprising, after the drying of the coating solution, attaching a release film to the layer containing the microcapsule, and winding the resulting sheet.

8. The process according to claim 1, further comprising, after the drying of the coating solution, attaching a release film to the layer containing the microcapsule, and winding the resulting sheet.

9. A sheet for electrophoretic display in which a layer containing microcapsule for electrophoretic display is formed on an electrically conductive layer of a substrate sheet with the electrically conductive layer formed on a substrate film, the sheet comprising microcapsule supporting parts on which the microcapsule are supported, and electrically conductive layer exposing parts on which the electrically conductive layer is exposed, both the microcapsule supporting parts and the electrically conductive layer exposing parts being alternately arranged in a width direction of the sheet such that the microcapsule supporting parts are discontinuously formed in the width direction of the sheet and continuously formed in a longitudinal direction of the sheet.

10. An electrophoretic display device comprising a data displaying part, wherein the data displaying part comprises a sheet for electrophoretic display according to claim 9.

11. An electronic equipment comprising a data displaying means, wherein the data displaying means comprises an electrophoretic display device according to claim 10.

12. A process for producing an electrophoretic display device which comprises assembling parts of an electrophoretic display device including the sheet for electrophoretic display according to claim 9 as a data display part.

13. A sheet for electrophoretic display in which a layer containing microcapsules for electrophoretic display is formed on an electrically conductive layer of a substrate sheet with the electrically conductive layer formed on a substrate film, the sheet comprising microcapsules supporting parts on which the microcapsules are supported, and electrically conductive layer exposing parts on which the electrically conductive layer is exposed, both the microcapsule supporting parts and the electrically conductive layer exposing parts being alternately arranged in a width direction of the sheet such that the microcapsule supporting parts are discontinuously formed in the width direction of the sheet and continuously formed in a longitudinal direction of the sheet, wherein a release film is attached to a surface of the sheet on which side the layer containing the microcapsules are formed, and the sheet is in the form of a wound roll.

14. A process for producing an electrophoretic display device which comprises assembling parts of an electrophoretic display device including the sheet for electrophoretic display according to claim 13 as a data display part.

15. A process for producing an electrophoretic display device comprising:

coating, on a strip-shaped substrate sheet in which an electrically conductive layer is formed on a substrate film, a coating solution containing a microcapsule for electrophoretic display by using a coating apparatus of a kiss-reverse coating system having a coating roll in which a gravure pattern is discontinuously formed in an axial direction of an external circumferential surface;

after the coating of the coating solution, drying the coating solution to form a layer containing the microcapsule on the electrically conductive layer to obtain a sheet for electrophoretic display in which a microcapsule supporting part on which the microcapsule is supported and an electrically conductive layer exposing part on which the electrically conductive layer is exposed are alternately arranged in a width direction of the sheet, the strip-shaped substrate sheet being moved during at least a part of a period in which the coating of the coating solution is carried out; and assembling parts of an electrophoretic display device including the sheet for electrophoretic display as a data display part.

* * * * *